(12) United States Patent
Buban et al.

(10) Patent No.: US 8,072,860 B2
(45) Date of Patent: Dec. 6, 2011

(54) DATA RECORDING/REPRODUCTION FOR WRITE-ONCE DISCS

(75) Inventors: Garret J. Buban, Carnation, WA (US); Yoshiho Gotoh, Osaka (JP); Rajeev Y. Nagar, Sammamish, WA (US); Sarosh C. Havewala, Redmond, WA (US); Vishal V. Ghotge, Seattle, WA (US); Ravinder S. Thind, Kirkland, WA (US)

(73) Assignees: Panasonic Corporation, Osaka (JP); Microsoft Corporation, Redmond, WA (US)

( * ) Notice: Subject to any disclaimer, the term of this patent is extended or adjusted under 35 U.S.C. 154(b) by 877 days.

(21) Appl. No.: 10/597,875

(22) PCT Filed: May 9, 2005

(86) PCT No.: PCT/JP2005/008823
§ 371 (c)(1),
(2), (4) Date: May 12, 2008

(87) PCT Pub. No.: WO2005/109428
PCT Pub. Date: Nov. 17, 2005

(65) Prior Publication Data
US 2008/0232210 A1 Sep. 25, 2008

Related U.S. Application Data

(60) Provisional application No. 60/569,536, filed on May 10, 2004, provisional application No. 60/569,537, filed on May 10, 2004, provisional application No. 60/577,734, filed on Jun. 7, 2004, provisional application No. 60/577,616, filed on Jun. 7, 2004, provisional application No. 60/605,491, filed on Aug. 30, 2004, provisional application No. 60/605,488, filed on Aug. 31, 2004, provisional application No. 60/668,237, filed on Apr. 4, 2005, provisional application No. 60/668,236, filed on Apr. 4, 2005.

(51) Int. Cl.
*G11B 20/18* (2006.01)
(52) U.S. Cl. .................................... 369/53.24; 714/6.13
(58) Field of Classification Search ............... 369/275.3, 369/53.24, 53.15, 53.17, 47.14; 714/6.13, 714/6.32, 723, 710, 711; 707/999.107, 999.1
See application file for complete search history.

(56) References Cited

U.S. PATENT DOCUMENTS
5,448,728 A 9/1995 Takano et al.
(Continued)

FOREIGN PATENT DOCUMENTS
KR 2003-0011100 2/2003
(Continued)

OTHER PUBLICATIONS

International Search Report for corresponding Application No. PCT/JP2005/08823 mailed Oct. 13, 2005.

(Continued)

*Primary Examiner* — Tan X Dinh
(74) *Attorney, Agent, or Firm* — Renner, Otto, Boisselle & Sklar, LLP

(57) ABSTRACT

A file system is enabled to use a Metadata Partition instead of VAT for write-once discs, and is provided by a pseudo-overwrite method with a plurality of tracks especially for metadata and file data. On applying this invention to a drive apparatus that supports pseudo-overwrite media, the file system distinguishes data to overwrite from data to append (S1701). When the data is newly written to a logical sector, the drive apparatus writes the data to a physical sector to which the logical sector corresponds (S1703). When the data being overwritten is data stored in the logical sector, the data is written to the other unrecorded physical sector in the volume space (S1704), and remapping information is written (S1705). The remapping information specifies the original address of the physical sector, and the remapping address of the physical sector in which the data is written.

4 Claims, 21 Drawing Sheets

U.S. PATENT DOCUMENTS

| | | | |
|---|---|---|---|
| 6,502,174 | B1 | 12/2002 | Beardsley et al. |
| 7,821,896 | B2 * | 10/2010 | Gotoh et al. ............... 369/53.24 |
| 7,823,032 | B2 * | 10/2010 | Ghotge et al. ................ 714/723 |
| 2007/0286046 | A1 * | 12/2007 | Nagar et al. ............... 369/53.24 |

FOREIGN PATENT DOCUMENTS

| | | |
|---|---|---|
| WO | 02/086898 | 10/2002 |
| WO | 02/086898 A1 | 10/2002 |

OTHER PUBLICATIONS

Takashi Yokozeki et al.; "A Virtual Optical Disk Method to Realize Rewritability and Revision Control on a Write-Once Optical Disk"; Systems & Computers in Japan; Scripta Technica Journals; New York, US; vol. 21, No. 8; Jan. 1990; pp. 34-43, XP000177819.

Optical Storage Technology Association (OSTA); "Universal Disk Format Specification, Revision 2.50"; Apr. 2003; pp. 33-45; XP002344951.

* cited by examiner

US 8,072,860 B2

DATA RECORDING/REPRODUCTION FOR WRITE-ONCE DISCS

TECHNICAL FIELD

The present invention relates to a recording method and apparatus for a write-once disc using a logical overwritable mechanism and a reproduction method and apparatus, and a semiconductor integrated circuit for use in a recording apparatus and/or a reproduction apparatus.

BACKGROUND ART

File systems for optical discs have made advances through various activities to develop UDF (Universal Disk Format®) specifications published from OSTA (Optical Storage Technology Association).

For write-once discs, the recording method has improved from multi-session recording to file-by-file recording using VAT (Virtual Allocation Table).

On the other hand, for rewritable discs, a volume and file structure has improved from the structure using non-sequential recording defined in ECMA 167, which is the international standard, to the structure using Metadata Partition specified in UDF Revision 2.5 (hereinafter UDF 2.5). Merits to using Metadata Partition include a performance improvement in retrieving metadata, such as file entries/directories, and an increase in the robustness from media damage.

However, Metadata Partition cannot be used for data appending usage on a write-once disc. This is because it is not allowed in UDF 2.5 to use Metadata Partition with VAT, due to the difficulty in implementing this combination.

Typically, it is also difficult to develop a new recording method for a write-once disc. This is because the physical characteristics of the write-once disc do not allow the data which is written at once to be overwritten. As the new recording method needs to be compatible with computer architecture, and needs to be implemented in a drive apparatus, and also considering the resources available of consumer appliances, the study of the new recording method was studied from several aspects.

The present invention has been made in view of the above subjects and includes an objective of providing the merits of Metadata Partition to the data recording usage on a write-once disc.

SUMMARY OF THE INVENTION

A recording method for instructing a drive apparatus having a pseudo-overwrite function to write data on a write-once disc, wherein the write-once disc, including a plurality of tracks according to the present invention, includes the steps of: (a) receiving a write request which specifies at least data for a file to be written; (b) instructing the drive apparatus to read a file entry of a metadata file which contains metadata for managing the file from a location of the write-once disc, so as to obtain the file entry of the metadata file; (c) obtaining track information indicating a location of each of the plurality of tracks; (d) determining a track from the plurality of tracks in which metadata is to be written next, based on the file entry of the metadata file and the track information; (e) instructing the drive apparatus to read the metadata from a location of the write-once disc, so as to obtain the metadata; (f) obtaining a next writable address indicating a location at which data is to be written next within a track other than the track determined in the step (d), the track being selected from the plurality of tracks; (g) updating the metadata to reflect the writing of the data specified by the write request; (h) instructing the drive apparatus to write the data specified by the write request to a location indicated by the next writable address in the write-once disc; and (i) instructing the drive apparatus to write at least a part of the updated metadata to the location from which the metadata is read in the step (e) in the write-once disc.

In one embodiment of the present invention, the method further includes the steps of: determining whether or not a next writable address within the track determined in the step (d) is valid; and when it is determined that the next writable address within the track determined in the step (d) is not valid, instructing the drive apparatus to allocate a first track in which metadata is to be written next and a second track in which data is to be written next, and updating the next writable address obtained in the step (f) to a next writable address within the second track.

In one embodiment of the present invention, the first track and the second track are allocated within the track selected in the step (f).

In one embodiment of the present invention, the method further includes the steps of: instructing the drive apparatus to write at least a part of the updated metadata at a location indicated by a next writable address within the first track; determining whether or not the first track is allocated and at least the part of the updated metadata is written in the first track; and when it is determined that the first track is allocated and at least the part of the updated metadata is written in the first track, updating the file entry of the metadata file to reflect the writing of at least the part of the updated metadata, and instructing the drive apparatus to write the updated file entry of the metadata file at the location from which the file entry of the metadata file is read in the step (b) in the write-once disc.

According to another aspect of the present invention, a system controller is provided for instructing a drive apparatus having a pseudo-overwrite function to write data on a write-once disc, wherein the write-once disc including a plurality of tracks, the system controller including a controller for controlling the drive apparatus, wherein the controller is configured to perform a process including the steps of: (a) receiving a write request which specifies at least data for a file to be written; (b) instructing the drive apparatus to read a file entry of a metadata file which contains metadata for managing the file from a location of the write-once disc, so as to obtain the file entry of the metadata file; (c) obtaining track information indicating a location of each of the plurality of tracks; (d) determining a track from the plurality of tracks in which metadata is to be written next, based on the file entry of the metadata file and the track information; (e) instructing the drive apparatus to read the metadata from a location of the write-once disc, so as to obtain the metadata; (f) obtaining a next writable address indicating a location at which data is to be written next within a track other than the track determined in the step (d), the track being selected from the plurality of tracks; (g) updating the metadata to reflect the writing of the data specified by the write request; (h) instructing the drive apparatus to write the data specified by the write request to a location indicated by the next writable address in the write-once disc; and (i) instructing the drive apparatus to write at least a part of the updated metadata at the location from which the metadata is read in the step (e) in the write-once disc.

In one embodiment of the present invention, the controller includes a semiconductor integrated circuit.

According to another aspect of the present invention a program is provided for use in a system controller for instructing a drive apparatus having a pseudo-overwrite function to write data on a write-once disc, wherein the write-once disc including a plurality of tracks, wherein the program is configured to perform a process including the steps of: (a) receiving a write request which specifies at least data for a file to be written; (b) instructing the drive apparatus to read a file entry of a metadata file which contains metadata for managing the file from a location of the write-once disc, so as to obtain the file entry of the metadata file; (c) obtaining track information indicating a location of each of the plurality of tracks; (d) determining a track from the plurality of tracks in which metadata is to be written next, based on the file entry of the metadata file and the track information; (e) instructing the drive apparatus to read the metadata from a location of the write-once disc, so as to obtain the metadata; (f) obtaining a next writable address indicating a location at which data is to be written next within a track other than the track determined in the step (d), the track being selected from the plurality of tracks; (g) updating the metadata to reflect the writing of the data specified by the write request; (h) instructing the drive apparatus to write the data specified by the write request to a location indicated by the next writable address in the write-once disc; and (i) instructing the drive apparatus to write at least a part of the updated metadata at the location from which the metadata is read in the step (e) in the write-once disc.

According to another aspect of the present invention a recording method for writing data on a write-once disc, the write-once disc having a plurality of physical sectors, the write-once disc including a volume space having a plurality of logical sectors, each of the plurality of logical sectors corresponding to one of the plurality of physical sectors, the write-once disc having a plurality of tracks, each of the plurality of tracks including at least one physical sector of the plurality of physical sectors, includes the steps of: (a) receiving a write instruction which specifies at least a logical sector in which data is to be written; (b) obtaining track information indicating a location of each of the plurality of tracks; (c) determining a track from the plurality of tracks in which data is to be written next, based on the logical sector specified by the write instruction and the track information obtained in the step (b); (d) determining whether or not the logical sector specified by the write instruction corresponds to a recorded physical sector or an unrecorded physical sector; (e) when it is determined that the logical sector specified by the write instruction corresponds to an unrecorded physical sector, writing the data into the unrecorded physical sector; and (f) when it is determined that the logical sector specified by the write instruction corresponds to a recorded physical sector, writing the data into a physical sector indicated by a next writable address within the track determined in the step (c), generating a remapping table including remapping information which remaps an original address of the recorded physical sector to a remapping address of the physical sector indicated by the next writable address, and writing the remapping table on the write-once disc.

In one embodiment of the present invention, the method further includes the steps of: receiving an allocation instruction; allocating at least one track in response to the allocation instruction.

In one embodiment of the present invention, the step of allocating at least one track includes a step of allocating a first track and a second track within the track determined in the step (c).

According to another aspect of the present invention, a drive apparatus for writing data on a write-once disc, the write-once disc having a plurality of physical sectors, the write-once disc including a volume space having a plurality of logical sectors, each of the plurality of logical sectors corresponding to one of the plurality of physical sectors, the write-once disc having a plurality of tracks, each of the plurality of tracks including at least one physical sector of the plurality of physical sectors, the drive apparatus including a drive mechanism for performing a recording operation for the write-once disc; and a drive control section for controlling the drive mechanism, wherein the drive control section is operable to perform a process including the steps of: (a) receiving a write instruction which specifies at least a logical sector in which data is to be written; (b) obtaining track information indicating a location of each of the plurality of tracks; (c) determining a track from the plurality of tracks in which data is to be written next, based on the logical sector specified by the write instruction and the track information obtained in the step (b); (d) determining whether or not the logical sector specified by the write instruction corresponds to a recorded physical sector or an unrecorded physical sector; (e) when it is determined that the logical sector specified by the write instruction corresponds to an unrecorded physical sector, controlling the drive mechanism to write the data into the unrecorded physical sector; and (f) when it is determined that the logical sector specified by the write instruction corresponds to a recorded physical sector, controlling the drive mechanism to write the data into a physical sector indicated by a next writable address within the track determined in the step (c), generating a remapping table including remapping information which remaps an original address of the recorded physical sector to a remapping address of the physical sector indicated by the next writable address, and controlling the drive mechanism to write the remapping table on the write-once disc.

According to another aspect of the present invention, a semiconductor integrated circuit is provided for use in a drive apparatus for writing data on a write-once disc, the write-once disc having a plurality of physical sectors, the write-once disc including a volume space having a plurality of logical sectors, each of the plurality of logical sectors corresponding to one of the plurality of physical sectors, the write-once disc having a plurality of tracks, each of the plurality of tracks including at least one physical sector of the plurality of physical sectors, wherein: the semiconductor integrated circuit is configured to control a drive mechanism for performing a recording operation for the write-once disc, the semiconductor integrated circuit is operable to perform a process including the steps of: (a) receiving a write instruction which specifies at least a logical sector in which data is to be written; (b) obtaining track information indicating a location of each of the plurality of tracks; (c) determining a track from the plurality of tracks in which data is to be written next, based on the logical sector specified by the write instruction and the track information obtained in the step (b); (d) determining whether or not the logical sector specified by the write instruction corresponds to a recorded physical sector or an unrecorded physical sector; (e) when it is determined that the logical sector specified by the write instruction corresponds to an unrecorded physical sector, controlling the drive mechanism to write the data into the unrecorded physical sector; and (f) when it is determined that the logical sector specified by the write instruction corresponds to a recorded physical sector, controlling the drive mechanism to write the data into a physical sector indicated by a next writable address within the track determined in the step (c), generating a remapping table including remapping information which remaps an original address of the recorded physical sector to a remapping address of the physical sector indicated by the next writable address, and controlling the drive mechanism to write the remapping table on the write-once disc.

These and other advantages of the present invention will become apparent to those skilled in the art upon reading and understanding the following detailed description with reference to the accompanying figures.

BEST MODE FOR CARRYING OUT THE INVENTION

An overwritable function for a write-once disc performed by drive apparatus has been studied. However, it was difficult to put it in practice, because the drive apparatus cannot know how much data will be overwritten and where the data will be overwritten.

For example, the data to be overwritten is stored in the other location as a write-once disc, and the information to specify the original location and the replacement location have to be handled in the drive apparatus. When the amount of overwritten data increases, it takes a longer time to search where it is replaced. Hence, such a drive apparatus could not read/write with enough performance due to its small resources (e.g. CPU speed and memory).

It is believed the new file system should distinguish the data to be overwritten and the data to be newly written, and the new file system can match with the drive apparatus which has an overwritable function. Then, the possibility to apply Metadata Partition for data appending usage on a write-once disc, without using VAT is found.

The strategic importance of this idea includes; by having the device handle the overwriting of existing blocks, the file system does not need to implement the logic. This reduces the complexity of the file system driver.

Meanwhile, write-once media is one of the cheapest and fastest ways to write data to removable media. However, it innately requires the drive to write data to one location on the disc. This location moves forward as data is written. Typically, this can result in substantial fragmentation of data. That is, data of a given kind or file is spread out across many regions on the disc.

The idea described below is a way to help alleviate some of above fragmentation by using multiple write points on the disc. Namely, metadata and a file will be stored at separate locations on the disc. By providing a mechanism to write to different locations on the disc, some of the limitations for its usefulness can be removed.

In the following embodiments, the investigations based on this idea are shown in detail.

Embodiment 1

The amount of the overwritten data can be reduced by optimizing the procedure in the file system. In this embodiment, the basic read/write operation is explained in accordance with the new recording method for the drive apparatus with the overwritable function of a write-once disc.

Hereinafter, embodiments of the present invention will be described with reference to the drawings.

Figure 1:
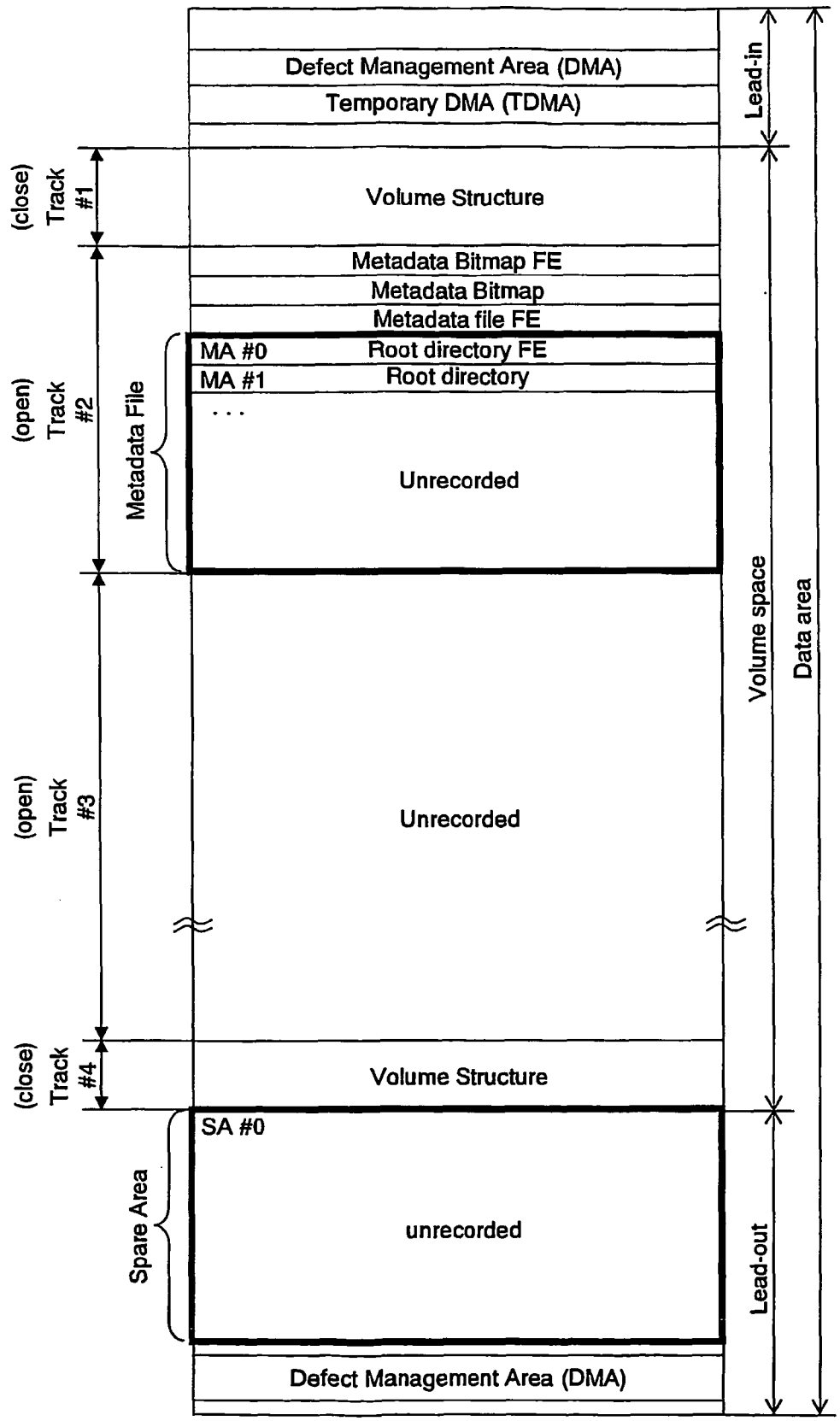
FIG. 1 is a diagram illustrating a configuration of areas when a file is recorded.
Figure 2:
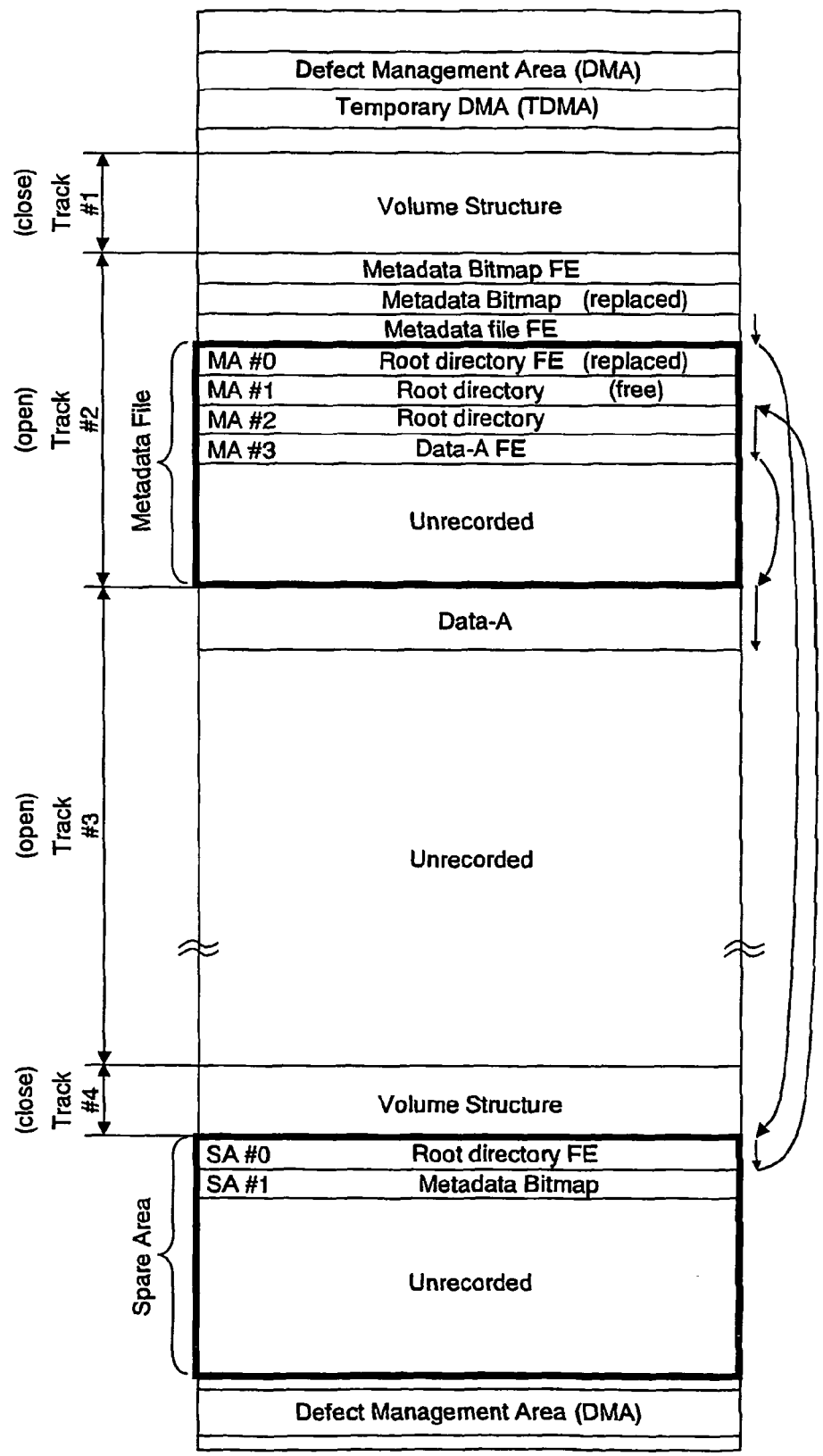
FIG. 2 is a diagram illustrating a configuration of areas when a Data-A file is recorded in a root directory of a disc having the state as shown FIG. 1.
Figure 4:
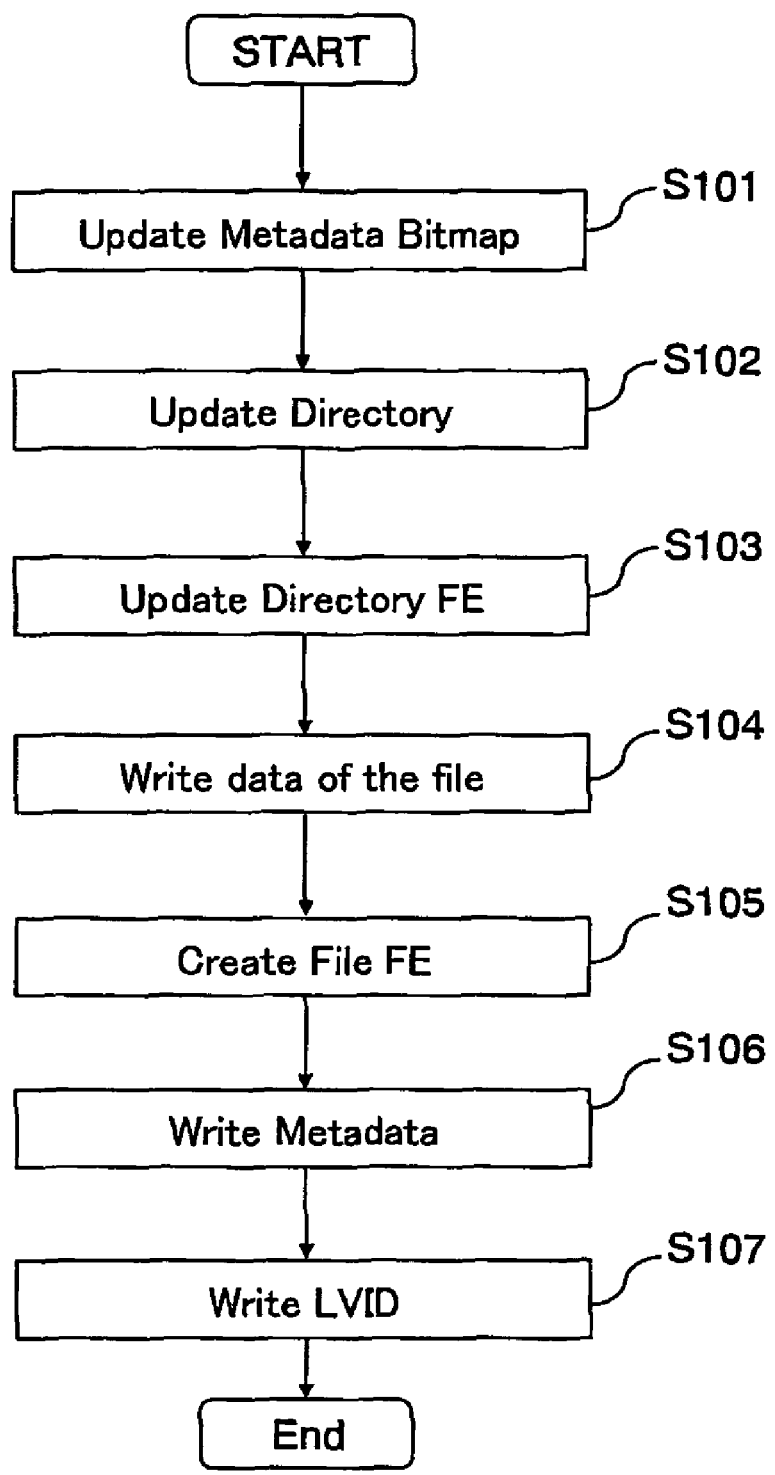
FIG. 4 is a flowchart illustrating a procedure for recording a file.

FIGS. 1 and 2 are diagrams showing a configuration of areas. FIG. 4 is a flowchart showing a procedure for recording a file. FIG. 1 shows the state after a logical format operation. FIG. 2 shows the state where a Data-A file has been recorded in a root directory on a disc having the state of FIG. 1.

Firstly, FIG. 1 will be described.

The data area includes areas such as a Lead-in area, a volume space and a Lead-out area, (wherein the Lead-in area and the Lead-out area are managed by a physical layer). The physical sector is an addressable unit in the data area, and the physical sector number is assigned in ascending sequence to each physical sector. The volume space consists of logical sectors, and a logical sector number is assigned in ascending sequence to each logical sector. Each logical sector corresponds to the physical sector uniquely in advance. For example, the logical sector with a logical sector number 0 corresponds to the physical sector with physical sector number 10000 and the start address of the volume space is stored in the Lead-in area.

The defect Management Area (DMA) is an area, in which information indicating the correspondence between the address of a block to be replaced and the address of a replaced block in a replacement operation is recorded as a defect list.

Temporary DMA (TDMA) is an area, in which a temporary defect list is recorded in an incremental write operation. When a disc is finalized to prohibit incremental write operations, a temporary defect list is registered as a defect list in the DMA. The DMA is provided in two portions of a disc, i.e., at an inner portion and at an outer portion. Thus, a defect list is recorded twice, in two different areas. In the DMA, disc information, such as track information, positional information of a spare area, and the like, are recorded.

The spare area is a replacement area, in which data is recorded by a replacement operation, which is equivalent to a linear replacement method. The spare area is assigned outside a volume space that is handled by a file system. In this example, data has been recorded in a portion of the spare area. Addresses in the spare area are inherently specified by using physical addresses. To simplify the explanation, relative addresses in the spare area are indicated by SA's (Spare area Address). Sectors in the spare area are in the unrecorded state.

In the present invention, the linear replacement algorithm that is generally used for defect management is applied to overwriting performed by the drive apparatus.

The volume space comprises four tracks. A track is an area in which the data is recorded sequentially from the beginning of the track on a write-once disc. The end of the recorded area in a track is managed by a drive apparatus. Track Status (Close and Open) indicates a status of a track. "Close" indicates that all sectors in a track have been used for data recording. "Open" indicates that there is at least one sector that has not been used for data recording. In other words, data can be incrementally written into an open track.

(Volume Structure)

The volume and file structure complies with UDF 2.5. A volume structure, which is located at an area having a smaller logical sector number, includes an Anchor Volume Descriptor Pointer, a Volume Recognition Sequence, a Volume Descriptor Sequence, and a Logical Volume Integrity Sequence. A volume structure, which is located at an area having a larger logical sector number, includes an Anchor Volume Descriptor Pointer and a Volume Descriptor Sequence. The Logical Volume Integrity Sequence, in which a Logical Volume Integrity Descriptor is recorded, is a part of a volume structure. Since the volume structure has been previously recorded, Tracks #1 and #4 are in the close state. Track #2 is the area assigned in order to write metadata. In FIG. 1, as an example, a Metadata file allocated in Track #2 has an unrecorded area. The Metadata file is also called a Metadata partition. The area consisting of Track #2 and #3 is called a physical partition. Track #3 is an area assigned to write the data of a file. Therefore, an area following the recorded area is in the unrecorded state.

(File Structure)

Metadata Bitmap FE (Metadata Bitmap file File Entry) is a file entry for organizing the areas allocated for a Metadata Bitmap. Metadata Bitmap is a bitmap for specifying available sectors which are ready for use in a Metadata file. Not only unrecorded areas but also an area which becomes an unused area by deleting a file entry or a directory are registered in the bitmap as available areas. Metadata file FE (Metadata file File Entry) is a file entry for organizing the areas allocated for a Metadata file. In a Metadata file, file entries and directories are recorded. In UDF, a File Set Descriptor is also recorded, which is not shown in the figure.

Root directory FE (root directory file entry) is a file entry for organizing the areas allocated for the root directory. A root directory FE is recorded in MA #0. A root directory is recorded in MA #1. MA (Metadata file Address) indicates a relative address within a Metadata file.

(File Recording Procedure)

An exemplary procedure for recording a Data-A file onto the write-once disc of FIG. 1 will be described with reference to FIGS. 2 and 4.

In step S101, the Metadata Bitmap is read into a memory and is updated in the memory to obtain a recording area in the Metadata file.

In step S102, a directory, under which a file is to be registered, is read into the memory, and is updated in the memory. In this example, the root directory is read out, and the Data-A file is registered.

In step S103, the file entry of the directory is read into the memory, and information (e.g., size and update time, etc.) of the directory is updated.

In step S104, the Data-A file data is recorded from the beginning of the unrecorded area in Track #3.

In step S105, in order to register the positional information of the recorded data, the file entry of the Data-A file is generated in the memory.

In step S106, the metadata and metadata bitmap updated or generated in the memory is recorded. For the root directory, the drive apparatus is instructed so that the data is written at MA #2 (unrecorded sector). Therefore, the root directory recorded at MA #1 becomes invalid, and the sector at MA #1 becomes an available sector in a logical space. Even if the drive apparatus is instructed so that data is written into such an available area in the Metadata file, the data cannot be written physically into the area, as long as the area is already recorded. For the file entry of the root directory, the data is instructed to be written into MA #0 (already-recorded area), and the data is stored into SA #0 in the spare area, which is the beginning of the unrecorded area in the spare area. For the file entry of the Data-A file, the data is instructed to be written into MA #3 (unrecorded sector). For metadata bitmap, the data is instructed to be written at the same place (already-recorded area), and then the data is stored into SA #1.

The replacement operation is a pseudo-overwrite operation of the present invention. As used herein, the term "pseudo-overwrite operation" refers to a logical overwrite operation, in which the mechanism of a replacement operation is used to write the data into the unrecorded area in response to an instruction to write the data into an already recorded area.

In step S107, it is instructed that the Logical Volume Integrity Descriptor is updated to indicate the integrity state of the file structure. The data is stored into the spare area (not shown in the figure) by a pseudo-overwrite operation.

As described in step S106, by recording a plurality of pieces of data together so that as many of the pieces of data as possible are recorded in the same ECC block (recording timing) by using a cache, it is possible to effectively utilize an unrecorded area. Particularly, a Metadata Bitmap or a Logical Volume Integrity Descriptor may not be updated every time a file is recorded. By recording the Metadata Bitmap or the Logical Volume Integrity Descriptor after a plurality of files have been recorded, it is possible to effectively use an unrecorded area of the spare area.

The Data-A file is read out in the following manner. The volume structure in Track #1 is read out. Thereafter, in order to access the Metadata file, the file entry of the Metadata file is read out. Thereafter, when the file entry of the root directory is read out, the outer area of the optical disc needs to be accessed because the actual data is recorded in the spare area. Then, the root directory recorded in the sector MA #2 and the file entry of the Data-A file recorded in the sector MA #3 are read out. So, the file data can be accessed, as the address information of the Data-A is obtained.

Figure 5:
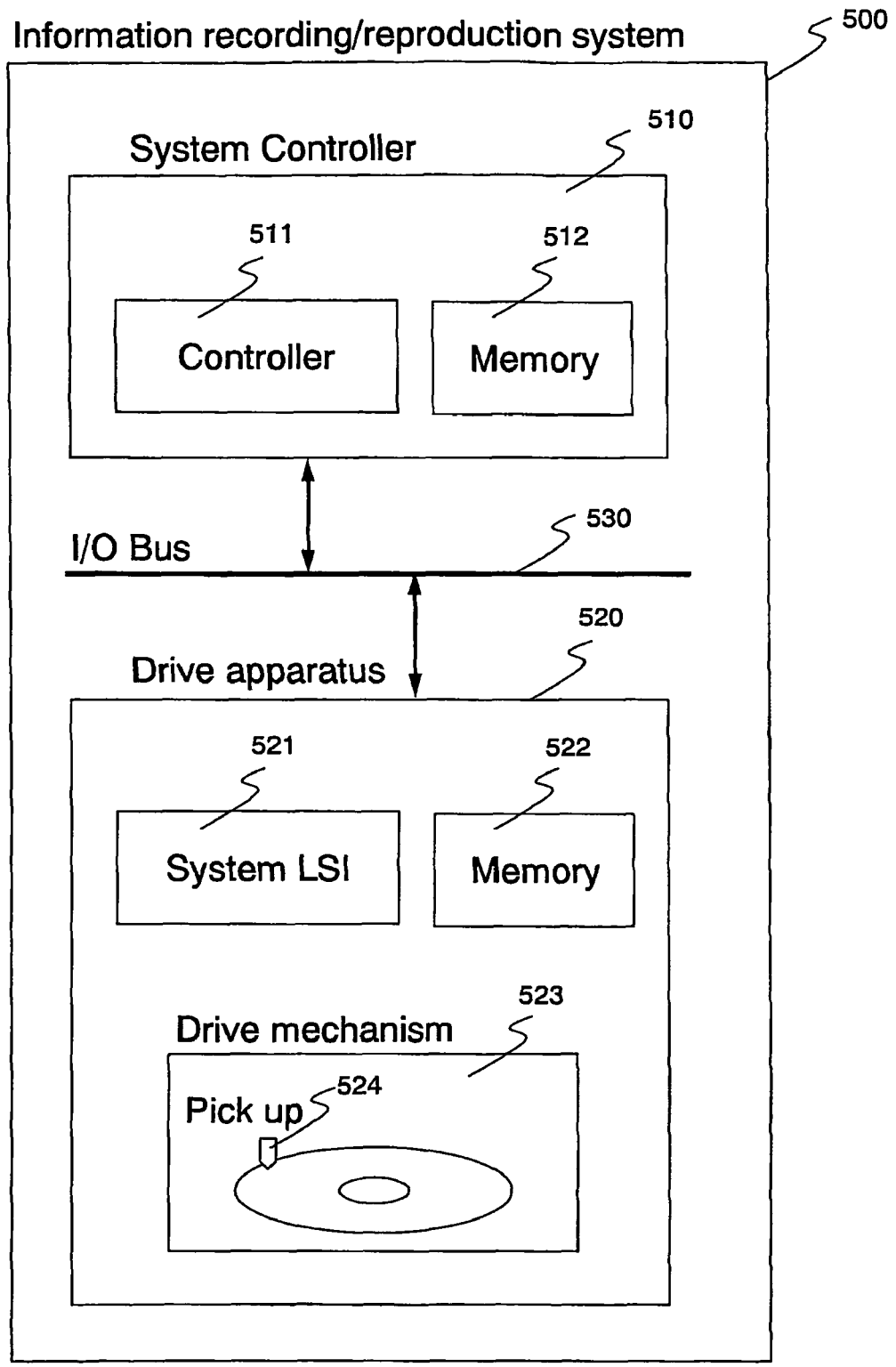
FIG. 5 is a diagram illustrating an optical disc information recording/reproduction system.

FIG. 5 shows an optical disc information recording/reproduction system 500 according to the present invention. The information recording/reproduction system 500 includes a system controller 510, a drive apparatus 520 for reading and writing information from and onto an optical disc, and an input/output bus 530.

Between the system controller 510 and the drive apparatus 520, instructions and responses using a command set and transfer of the read/write data are performed through the input/output bus 530.

The system controller 510 includes a controller 511 and a memory 512. The system controller 510 may be a personal computer. The controller 511 may be, for example, a semiconductor integrated circuit such as a CPU (Central Processing Unit) and performs the method described in the embodiments of the present inventions.

Further, a program for causing the controller 511 to perform the method described in the embodiments is stored in the memory 512. In the controller 511, a file system, a utility program, or a device driver may be performed.

The drive apparatus 520 includes a system LSI 521, a memory 522 and a drive mechanism 523. A program for causing the system LSI 521 to perform the method described in the embodiments of the present inventions may be stored in the memory 522. The system LSI 521 may be formed on a semiconductor chip and may include a micro processor.

The drive mechanism 523 includes a mechanism for loading an optical disc, a pickup 524 for writing/reading the data from/onto a disc, a traverse mechanism for moving the pickup 524. The drive mechanism 523 is controlled by the system LSI 521.

As explained above, the data of a file can be recorded without being overwritten, some of the metadata can be recorded using pseudo-overwrite. Typically, the size of the metadata needed to update a file is smaller than the data size of the file, and then the size of data to be overwritten can be reduced. The size of a file entry is 2048 bytes, and the size of a directory depends on the number of files and the length of the file name. As an example, if each file name is 12 characters and 39 files are recorded in the directory, the directory information can be recorded within a sector of 2048 bytes. Therefore, the read/write operation can be realized basically for a write-once disc by combining the new recording method and the drive apparatus with the overwritten function.

Embodiment 2

This embodiment describes a recording method to improve access performance when a file is read out by recording all areas in the Metadata file in advance.

In UDF 2.5, a Metadata file has been introduced to record metadata such as file entry and directory information within the localized area, so as to prevent the metadata from being spread out in a volume space, thereby achieving efficient access to file management information. This also greatly improves the performance when the metadata on the damaged disc is repaired by utilities such as scan disk. As described in embodiment 1, however, some data in the Metadata file is inevitably recorded into the spare area if the data needs to be subject to a pseudo-overwrite operation. Therefore, extra access time is required. If the number of files to be recorded is small, the extra access time would not be very problematic. However, if the hierarchy of a directory becomes deeper and the number of files under each directory is increased, particularly in the large-capacity optical disc case, the time needed to access prescribed files is problematically large.

Figure 3:
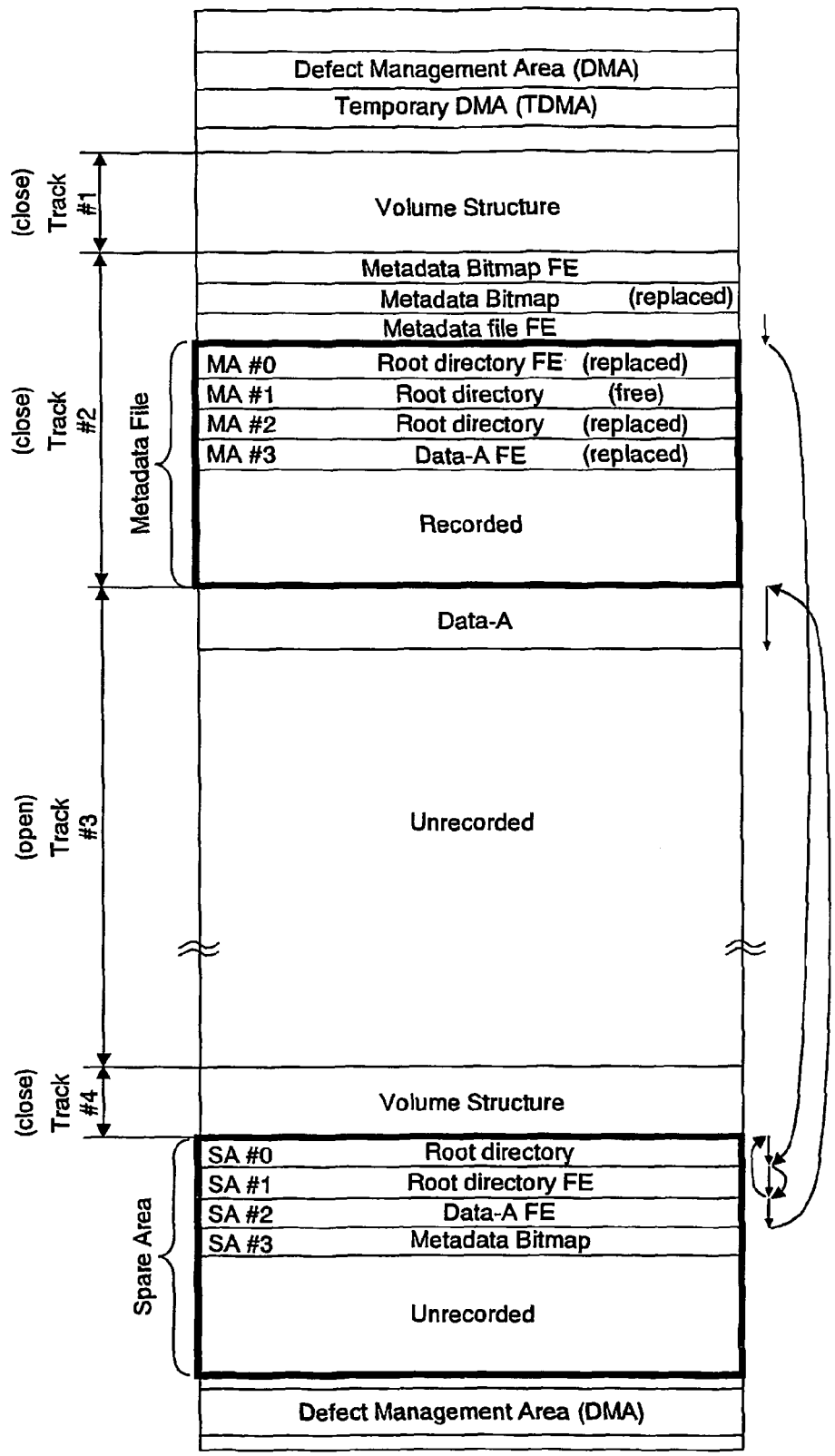
FIG. 3 is a diagram illustrating a configuration of areas when a Data-A file is recorded in a root directory on a disc which having a larger spare area.

In this embodiment, all areas in the Metadata file are recorded at the time of a logical format. FIG. 3 is a diagram illustrating a configuration of areas on the disc on which the same data as shown in FIG. 2 is written. The difference in FIG. 3 from FIG. 2 is that the area allocated for the Metadata file is recorded before the file is written. Therefore, Track #2 is in the close state.

A procedure for recording the Data-A file will be described below with reference to FIG. 3. The file system instructs to the drive apparatus so that a root directory is recorded logically into MA #2. Although the data is recorded into a logically available area in the Metadata file, the area in the Metadata file is an already recorded area. Therefore, the root directory cannot be written physically into MA #2. Then, the root directory is written physically into SA #0 by a pseudo-overwrite operation. Similarly, although the file system instructs so that a root directory FE is recorded logically into MA #0, the data is written physically into SA #1 by a pseudo-overwrite operation. Thereafter, the data of Data-A file is written into Track #3 from the beginning of the unrecorded area. The file system obtains address information of the beginning of the unrecorded area before performing the write operation. To specify the location that the Data-A file has been recorded, the file system instructs so that the file entry of the Data-A file is recorded logically into MA #3, and the data is actually written into SA #2 by a pseudo-overwrite operation.

The file system recognizes that the root directory, the root directory FE, and the Data-A FE have been recorded logically in the Metadata file. As the pseudo-overwrite operations are performed by an optical disc drive apparatus, only logical address information is transferred via an interface between the drive apparatus and the system controller. At this time, MA #1 is available, and MA #2 and MA #3 are logically already-recorded areas in the Metadata file. The file system instructs so that the Metadata Bitmap is updated and recorded as to indicate the above-described state, then the corresponding data is recorded into SA #3 in the spare area by a pseudo-overwrite operation.

A Data-A file of FIG. 3, which has been recorded with the recording method of the present invention, is read out as follows. After reading a volume structure from Track #1, the file entry of the Metadata file is read out. Thereafter, the file entry of the root directory, the root directory, and the file entry of the Data-A in a spare area are read out. All of this information have been recorded in the spare area by pseudo-overwrite operations. Therefore, no access between the Metadata file and the spare area is required.

The inherent object of introducing a Metadata file is achieved. This is because although a Metadata file is logically allocated in a physical partition, the data written into the Metadata file is actually written in the spare area by pseudo-overwrite operations. Thus, data is recorded into the spare area regardless of whether or not there is a defect in the Metadata file.

Figure 6:
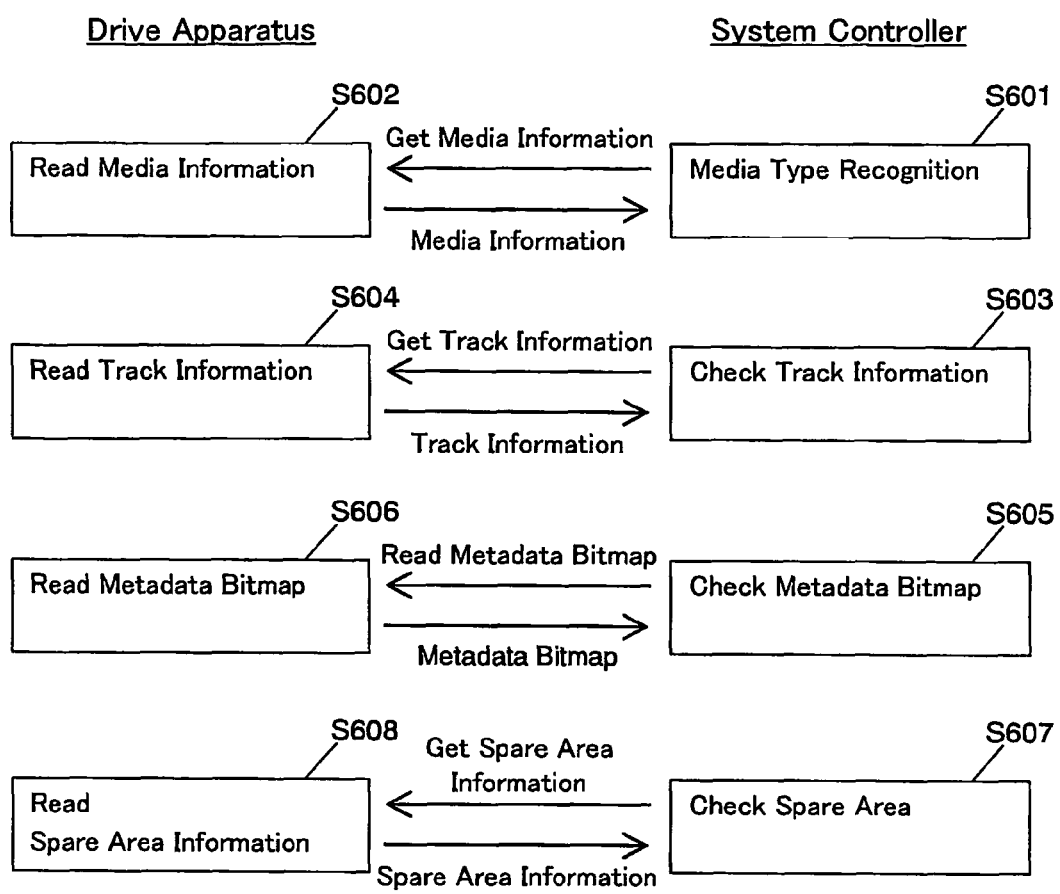
FIG. 6 is a diagram illustrating transfer of commands between a drive apparatus and a system controller.

FIG. 6 is a diagram illustrating data transfer with commands between a drive apparatus and a system controller. Specific commands can be applied to standards defined by ANSI (American National Standards Institute) or Multi-Media Command Set Standards defined by the INCITS (Inter National Committee for Information Technology Standards) T10.

Steps S601, S603, S605, and S607 indicate procedures performed by the system controller. Steps S602, S604, S606, and S608 indicate procedures of the drive apparatus.

In step S601, the type of a medium loaded into the drive apparatus is requested from the system controller and the system controller recognizes the media is the write-once pseudo-overwritable disc and recognizes that the drive apparatus supports the pseudo-overwrite function.

In step S602, the drive apparatus reads out information of the type of the loaded disc. The drive apparatus also determines whether or not the pseudo-overwrite function is supported with respect to the disc. The drive apparatus informs the system controller of these pieces of information.

In step S603, by requesting the track information of a write-once disc, the system controller obtains the information from the drive apparatus. Specifically, the size of an unrecorded area in Track #3, and the next writable address in the track or the last recorded address in the track are requested. In order to write the data of the file, it is necessary to get the above-described information in advance, and it is checked whether or not the unrecorded area has a prescribed size or more. Since in Track #3 an additional Metadata file may be allocated, for example, the prescribed size may be 128 MB for the disc of a whole capacity with 23 GB. If the size of the unrecorded area is less than the prescribed size, the disc is used as a read-only disc. If the size is equal to or greater than a prescribed size, the procedure goes to the next step. The size of a file entry is 2 KB. When only file entries are recorded in an available area of 128 MB, file entries corresponding to 65,536 files at most can be recorded.

In step S604, the drive apparatus reads the information related with the number of tracks, the positional information and the open/close state of each track, or the last recorded address information, from the lead-in area, DMA, or TDMA of the loaded disc. The system controller is informed of these pieces of information.

In step S605, the drive apparatus is instructed to read the Metadata Bitmap area. As a result, the system controller obtains the Metadata Bitmap, and it is checked whether or not there are available sectors. If there are available sectors, the procedure goes to the next step. If there are no available sectors, an additional area for a Metadata file is assigned in the unrecorded area of Track #3 to reserve the available sectors. In this checking, the system controller may determine whether the additional area for a Metadata file is reserved or not, by using the prescribed size for the available sectors, for example, the prescribed size may be 128 KB.

In step S606, the drive apparatus reads data from the specified area, and transfers the data to the system controller.

In step S607, by requesting spare area information to the drive apparatus, the system controller obtains the information and checks whether or not there is an unrecorded area in the spare area having a prescribed size or more.

For example, when the size of the unrecorded area is equal to or greater than 8 MB, the disc is usable as a recordable disc. When the size is less than 8 MB, the disc is used as a read-only disc. The spare area is used not only for pseudo-overwrite, but also for defect management. Therefore, an additional unrecorded area is needed to recover defective sectors on the disc.

In step S608, the drive apparatus reads the number of spare areas, the size of spare areas, and the size of an unrecorded area in each spare area, from the lead-in area, DMA, or TDMA of the loaded disc. The system controller is informed of these pieces of information.

As described above, the data is recorded in the unrecorded area in the spare area by pseudo-overwrite or defect management. The write-once disc drive apparatus of the present invention has a function to send the free area information as well as the type information of a medium to a system controller, because the drive apparatus stores the data at some location which may be different from the location the file system expects. By requesting this free area information whenever a file is recorded, the system controller decides whether the file can be recorded or not, as a result, the system controller can record a file correctly with the related data in the Metadata file.

Embodiment 3

In the previous embodiment 2, the metadata is remapped into the spare area to reduce the access time to retrieve the metadata. To achieve this, the spare area with sufficient size has to be assigned at the time of formatting on a write-once disc, as the size of spare area cannot be expanded after that. However, a user cannot know how many files and the size of the files that will be recorded on the disc, therefore, it is difficult to decide the appropriate size of the spare area at the time of formatting. If all of the spare area is used, no file can be recorded on the disc, even if the unrecorded area remains in the user data area. On the other hand, if a larger spare area is assigned, after all of the user data area is used, an unrecorded area may remain in the spare area.

Further, in the example of embodiment 2, more entries in the remapping table will be used than embodiment 1. This requires a drive apparatus capable of handling a larger table to search the remapped sectors. The file system driver has to check the size of unrecorded area in the spare area each time when a file is recorded, hence the space management becomes difficult to implement.

So, hereinafter a recording method in which the direction to replace the data not only within the spare area but also within the user data area is explained.

At first, an idea of the present invention is described:

Devices handle the overwriting of existing data by writing the new data to the next writable block and creating an entry in a remapping table stored by the drive apparatus. The file system continues to use the same logical block number, and the drive apparatus remaps the request to the new location based on the entry in the table. In order to reduce the size of this table, the file system does not reuse blocks after they are freed. That is, the file system has to be aware that it is using write-once media, and has to adjust its behavior accordingly.

The device uses the normal volume space to store the remapped data. That is, it is writing to the next writable location within the same track that the original block exists. The file system queries the device for the next writable block whenever it needs to allocate new space. So both the file system and the device are sharing the same space for writes.

Secondly, the effectiveness of the above idea is described using FIGS. 7A-7D, 8A-8B and 9:

FIGS. 7A-7D and BA-8B show the blocks in a user data area. Herein, a block rather than a sector is used to explain the idea generally. The user data area is recognized as a volume space by the file system. For each block, a Physical Block Address (hereafter described as PBA) and a Logical Block Address (hereafter described as LBA) are assigned so that the correspondence between PBA and LBA are decided in advance, wherein as an example, PBA is assigned from the number 100 and LBA is assigned from the number 0.

Figure 9:
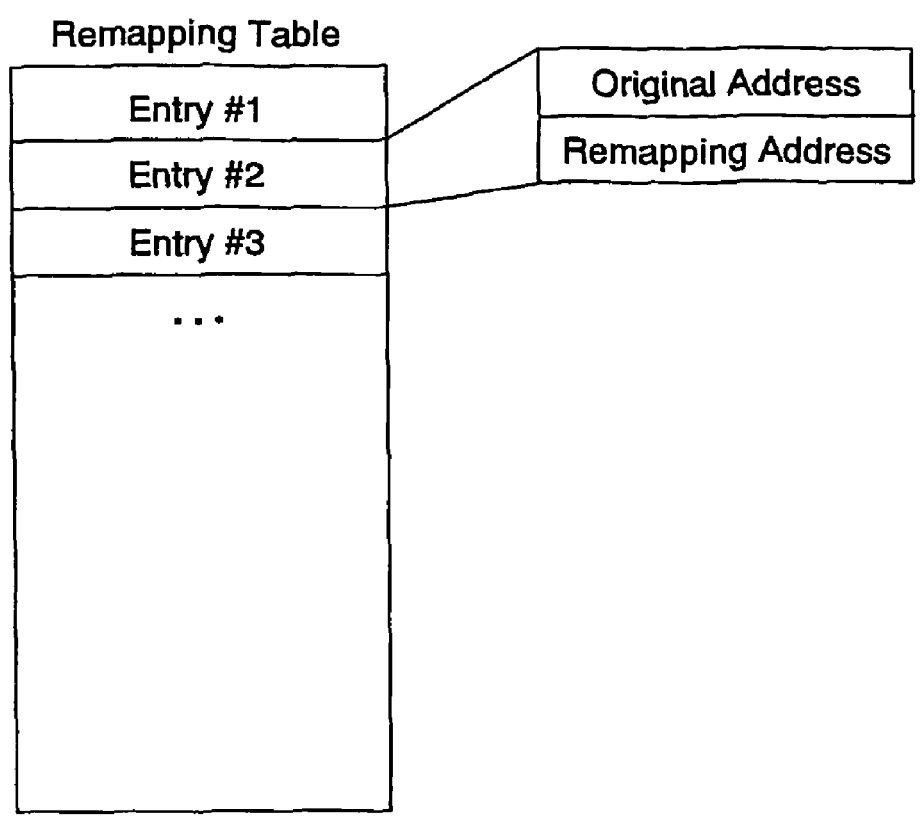
FIG. 9 is a diagram illustrating the data structure of the remapping table.

FIG. 9 shows the data structure of the remapping table stored by the drive apparatus. The table has entries, each of which specify the original address and remapping address. This data structure may be the common data structure with the defect list that is used for defect management for rewritable discs.

Typically, it had seemed that the above idea was not effective, because there are contradictions when applied to rewritable discs.

Figure 7A:
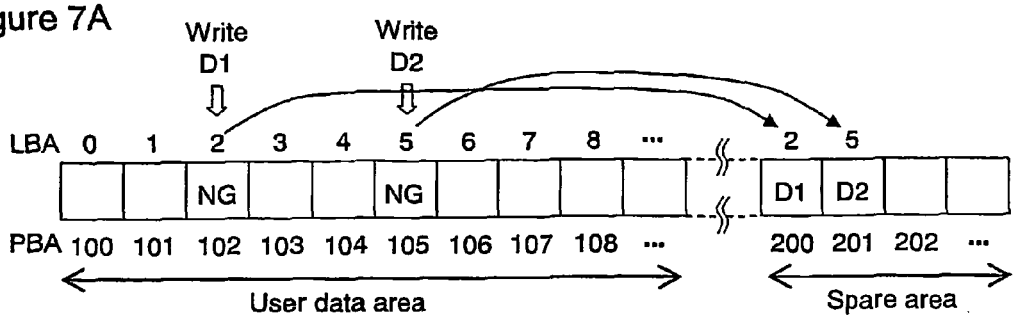
FIGS. 7A-7D each comprise a diagram illustrating the blocks in a user data area, when the data is remapped for a rewritable disc case and write-once disc case.

As shown in FIG. 7A, a rewritable disc has a spare area, in which a PBA is assigned from the number 200, for example. In a usual case for a rewritable disc, if the data are written to the blocks of LBA 2 and 5 and these blocks are defective, these data are stored into the blocks PBA 200 and 201 in the spare area using a linear replacement algorithm. This means LBA 2 and 5 is re-assigned to PBA 200 and 201. Thus, when some block in the volume space becomes an unusable block due to a defect, it is compensated with a good block in the spare area.

Figure 7B:
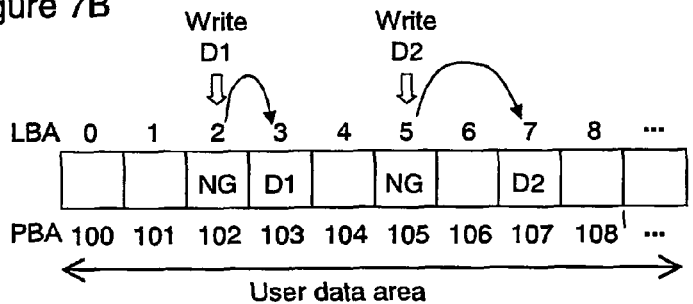

If the above idea was to be applied to a rewritable disc, as shown in FIG. 7B, the data to write LBA 2 and 5 would be stored into the blocks in a user data area, for example, PBA 103 and 107. However, these remapped blocks of PBA 103 and 107 cannot be used to store the data requested to LBA 3 and 7, as these blocks are replaced as LBA 2 and 5. This situation breaks the assumption to provide a defect free logical space, in which the assumption that the data capacity on the rewritable disc shall not be reduced, when any data is recorded by the file system. Further, in this situation, the drive apparatus could not decide the location to remap the data, because the file system may write the data randomly and only the file system handles the space bitmap which specifies the available area for recording.

Figure 7C:
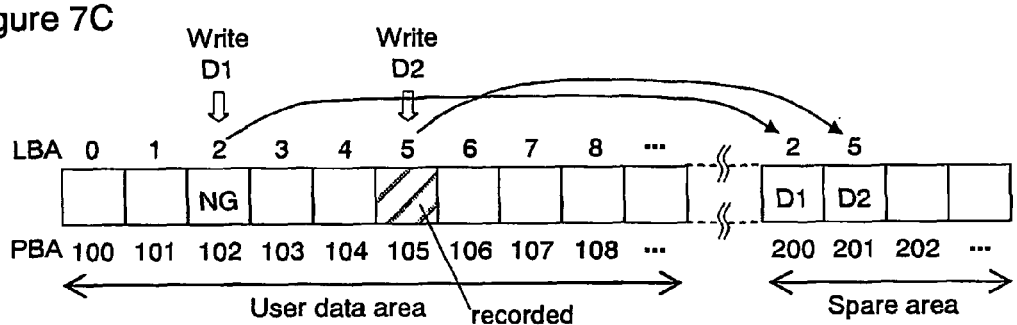

As explained in embodiment 1, the linear replacement algorithm can also be applied to write-once discs. As shown in FIG. 7C, the spare area is assigned for the write-once disc in advance. If the block is overwritten or can not be written due to a defect, the block is compensated with the block in the spare area. As examples, when the data D1 is written to LBA 2, if the block is defective, the block is compensated with the block of PBA 200. When LBA 5 is written by the data D2, even if the PBA 105 is already recorded, the data is stored into PBA 201.

It is supposed that a block to be overwritten and a defective block should be compensated with another block which belongs to outside of the volume space. This idea seems to be a contradiction not only for rewritable discs, but also for write-once discs.

Figure 7D:
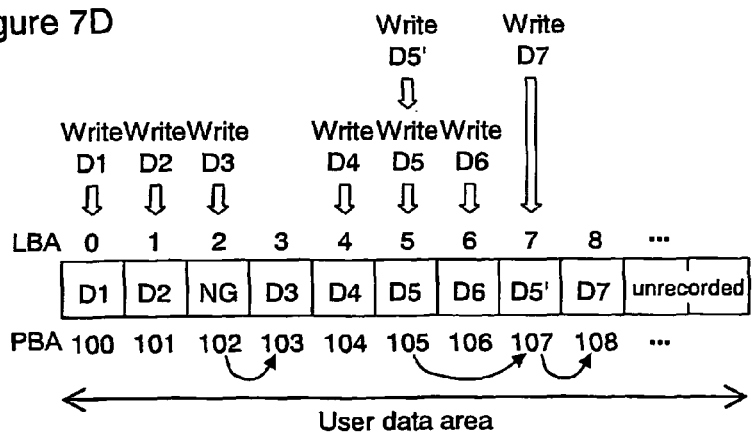

However, according to the present invention, write-once discs may not guarantee to provide defect free logical space like rewritable discs, because if a block on a write-once disc is written once, it is not possible to change the data in the block. And the new file system for write-once discs would write the data using sequential recording. On this point, this idea is effective for a write-once disc as shown in FIG. 7D. The data D1, D2 and D3 are written to LBA 0, 1 and 2, sequentially, at this time if the block PBA 102 is defective, then the data may be written to the next block PBA 103. Further, the data D4, D5 and D6 are written to LBA 4, 5 and 6, sequentially, and then the updated data D5' may be overwritten to LBA 5. On this overwrite, the data is stored into the block PBA 107 which is the next writable location. Thus, this idea does not require changing the assignment of a logical block number, because whenever the overwritten is needed, the data can be written to the next writable location until the user data area is used up. In case of a rewritable disc, the data can not be recorded into the block used for remapping, but there is no problem for the present invention of a write-once disc. For example, the data may be recorded further into the block of LBA 7. In this case, the data is stored in PBA 108 and the entry to specify this remapping from the original address of PBA 107 to the remapping address of PBA 108 is added in the remapping table.

As explained above, according to the present invention, even if the Logical Block Address is double booking, the drive apparatus can record the data by assigning a new Physical Block Address to NWA.

Figure 8A:
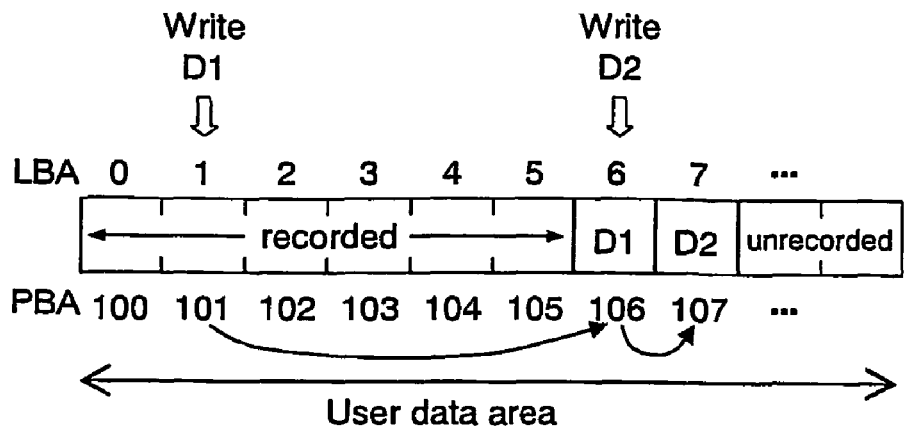
FIGS. 8A and 8B each comprise a diagram illustrating the blocks in a user data area, when the data is written to NWA.
Figure 8B:
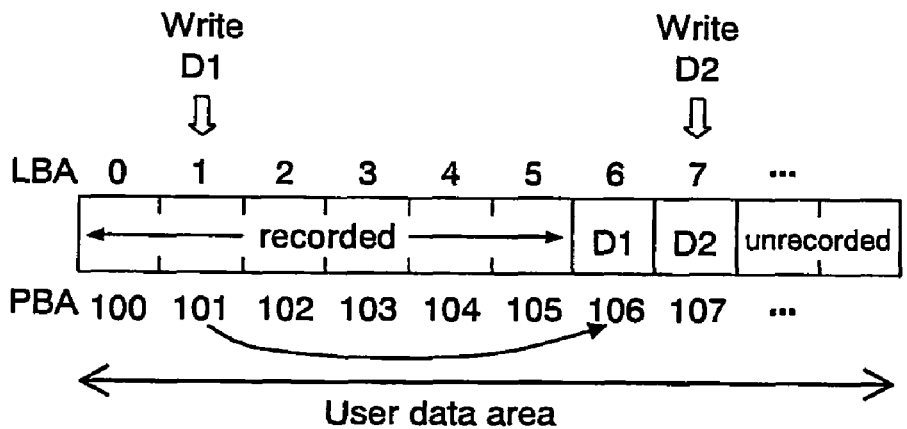

Another important point to be practical to the above idea is to save the entries stored in the remapping table by querying the next writable address from the file system to the drive apparatus. FIGS. 8A and 8B show the mechanism to reduce the size of the table. In this figure, blocks PBA 100 to 105 are recorded in advance. As shown in FIG. 8A, when the data D1 is written to LBA 1, the data is stored in the next writable location PBA 106 and one entry is added to specify PBA 101 is remapped to PBA 106. At this moment, the file system does not know where the data is remapped. If the file system instructs to write the new data D2 to the previous next writable location LBA 6, the data is stored to the next block PBA 107 and one entry is added. In the present invention, the file system checks the updated next writable address before any data is recorded barring overwrite, and instruct to write the data at the updated next writable address, of which is LBA 7 in FIG. 8B. Thus, an additional entry is not needed. The file system will not also reallocate the data to the deleted file area, barring the requirement to overwrite for the same reason.

Furthermore, the space management by the file system can be simplified, because the file system uses only NWA in each track to allocate the new area for recording. This means the file system may not be checked in the spare area, and may not record the space bitmap, especially the Metadata Bitmap.

The unit to remap the area may be an ECC block comprising a plurality of physical sectors. When a physical sector is remapped, all of the physical sectors in the ECC block to which the physical sector belongs are remapped. In this case, the original address and remapping address in the entry of the remapping table are specified by the physical address of the start sector of the ECC block. As an addressable unit, the physical block and the logical block may be the physical sector and the logical sector. Even if one sector is newly written, one ECC block including the sector is written, then the NWA is moved to the start sector of the next ECC block. Therefore, when several data are written, these data are allocated so that these data are written with the same ECC block.

By the present invention, the merits to using the Metadata Partition can be provided for the use on the write-once disc. At first, the data to be overwritten is remapped within the track for metadata writing, then the access to retrieve the metadata can be localized and the retrieving performance is improved. As usual, the overwritten data is stored in the same track as long as the track has unrecorded sectors. When the track is used up by data recording, the overwritten data may be stored into the other track, as it is given the priority to write the data to the other unrecorded physical block in the same track. Secondly, a Metadata Mirror File can be recorded to improve the robustness, when an additional track for a Metadata Mirror File is assigned.

These merits come from the following idea:
When writing data, the file system decides which track to use based on the type of data. It then queries the device to determine the location of the next write point for this track. If the track becomes full, the file system can, at its discretion, chose a different track.

As an example, consider a piece of media formatted with two tracks. The first track is used to store metadata. The second track is used to store file data. When the file system needs to write metadata, it queries the device for the write point of the first track and uses that location to store the metadata. If the file system needs to write file data, it queries the device for the write point of the second track and uses that location to store the file data. If either track becomes full, the file system can decide to use free space that may exist in the other track. This allows the file system to group metadata together and file data together as much as possible. By grouping the data together, fragmentation is reduced.

This idea could be used by the Universal Disk Format (UDF) file system. It would allow some of the benefits of version 2.50 to be used on write-once media. Currently, UDF 2.50 requires rewritable media, due to the way the metadata is stored. One of the main reasons UDF 2.50 was developed was to group metadata together; separate from file data. This benefit is lost on write-once media. By using this idea, this benefit could be realized on write-once media.

This idea could be also used to group similar data together for specific purposes. For example, audio could be stored in one track and video stored in another. Or still pictures stored in one track and video stored in another. The benefit here is to separate data that has different update patterns. If a user frequently creates, edits, and deletes pictures, this data could be kept separate from a video that is continually being added to. This would prevent the picture data from becoming intermixed with the video stream.

A special allocation method could be used if two tracks are reserved. This method would create one fixed size reserved track and leave a second track as open state. If the first track became full, the second track could be closed at its current write point, and two new tracks created. These new tracks would follow the same pattern as the first two tracks. This process could continue until the disk became full. This would allow for a file system to group like data together in large chunks. For example, this could be used with the UDF file system to allow the metadata to be stored in large chunks on write once media in a manner analogous with how metadata is stored with UDF 2.50 on rewritable media.

FIGS. 10A-10E are diagrams illustrating a configuration of areas to explain the above-mentioned strategy of the multi-track recording. The special allocation method is shown in FIGS. 10A-10E.

Figure 10A:
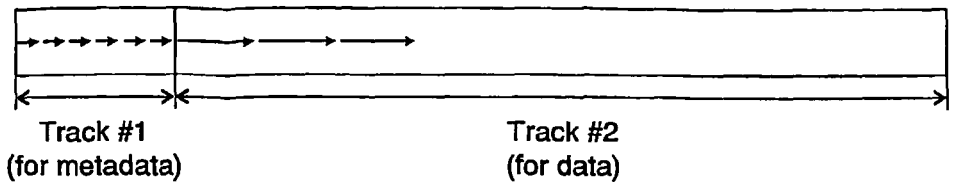
FIGS. 10A-10E each comprise a diagram illustrating a configuration of areas to explain the strategy of the multi-track recording.
Figure 10B:
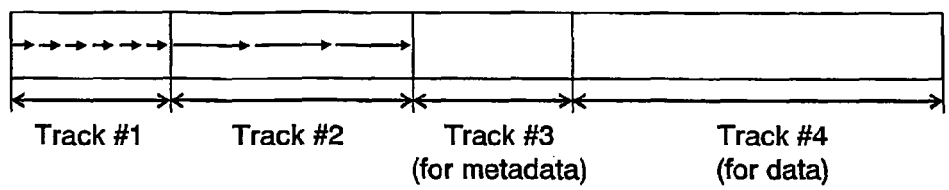
Figure 10C:
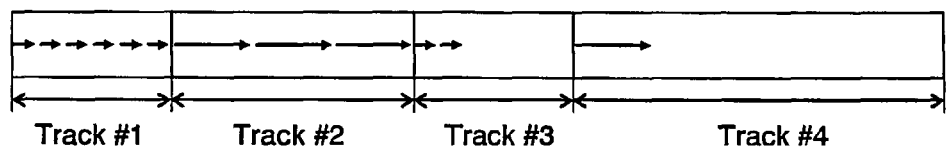

In FIG. 10A, two tracks are reserved to write the metadata and file data. When the first track for metadata is used up, the file system requests that the drive apparatus assigns a new track in the track for data as shown in FIG. 10B. Then the new Track #3 for metadata writing is reserved in the Track #2 in FIG. 10A, and remaining Track #4 can be used for data writing. It is clear that there is no longer any NWA in Tracks #1 and #2. As Tracks #3 and #4 are newly allocated, NWAs are available at the start addresses in the newly assigned tracks. In FIG. 10C, the metadata and the file data can be written into the new tracks: Track #3 and #4.

Figure 10D:
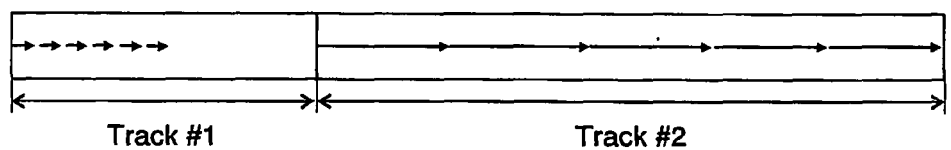
Figure 10E:
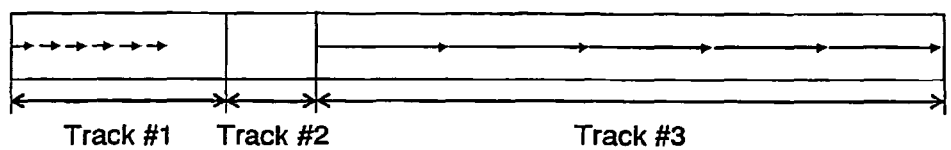

In FIG. 10D, two tracks are reserved to write the metadata and file data. In this case, Track #1 for metadata writing is larger than the track described in FIG. 10A in order to record metadata as long as necessary. When the second track for data is used up, the file system requests that the drive apparatus assigns a new track in the back of the track for metadata, as shown in FIG. 10E, so that the first track and second track have unrecorded area. Then the new Track #2 for data writing is reserved in the Track #1 in FIG. 10D; therefore a shorter track is allocated as Track #1. After Track #2 is reserved, the track number of Track #2 in FIG. 10D is changed as Track #3 in FIG. 10E. There is no NWA in Tracks #3, any more. As Track #2 is newly allocated, the NWA is available at the start addresses in the newly reserved track. In FIG. 10E, the metadata and the file data can be written into the new tracks: Track #1 and #2.

Herein, the potential for overwriting is estimated for the example case that the capacity of the disc is 23 GB (=23× 1024^3 bytes), the ECC block consists of 32 sectors, and the sector size is 2 KB (=2×1024 bytes). If the average size of the files recorded on the disc is 128 KB and 10 files are stored in the directory on average, about 188,000 files and 18,800 directories can be recorded on the disc. When the file system clusters the file entries to be updated into an ECC block, about 6,400 entries are needed in the remapping table. The size of the table becomes about 50 KB when the size of the entry is 8 bytes. When the drive apparatus can handle 256 KB of the remapping table as the maximum size, 188,000 files and 18,800 directories would be written randomly. Thus, this invention is also practical for the next generation write-once optical discs using blue laser technology.

The examples of applying the above idea to a new file system based on UDF and the next generation write-once disc are described.

Figure 11:
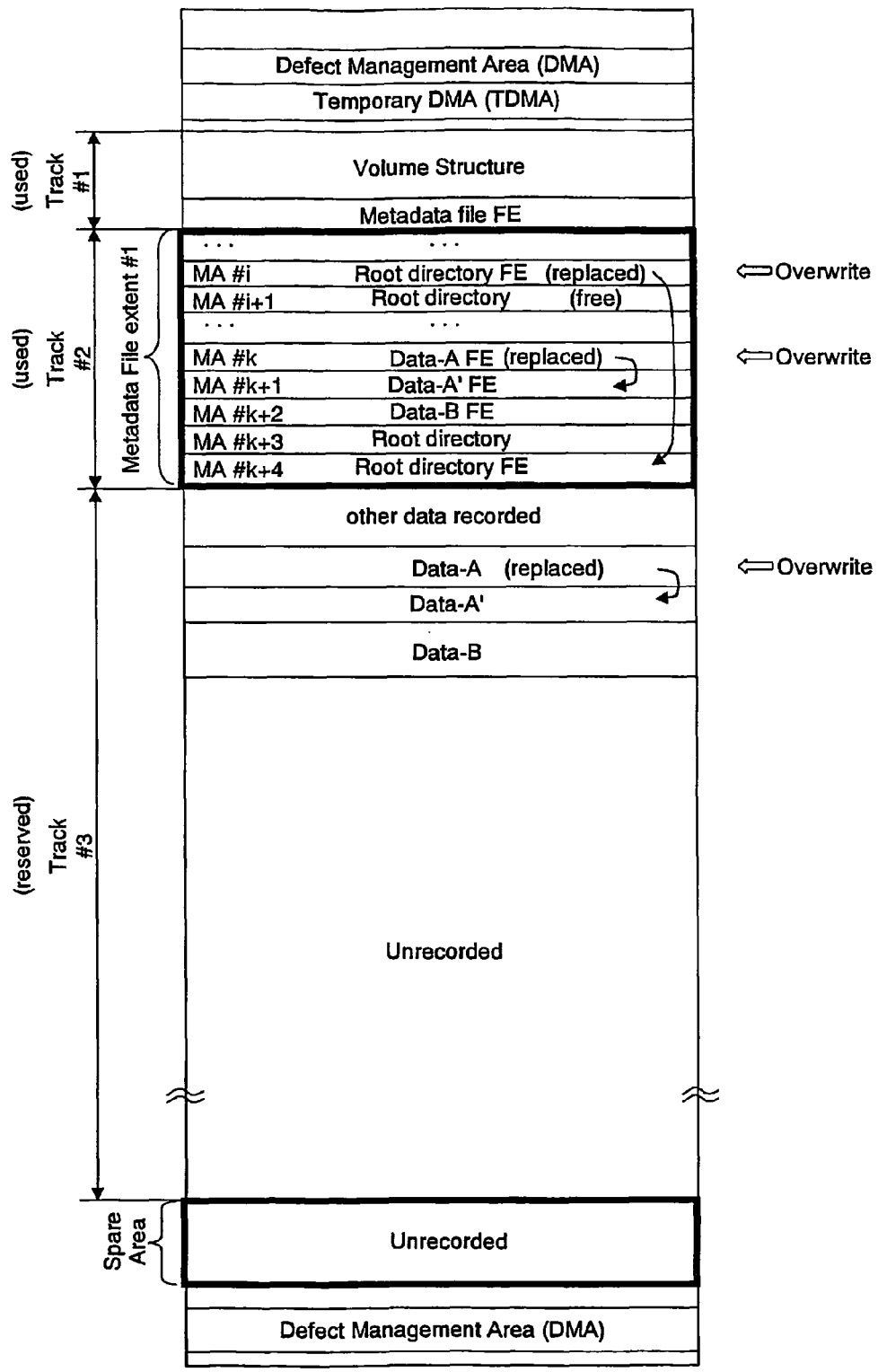
FIG. 11 is a diagram illustrating a configuration of areas to explain a pseudo-overwrite method.

FIG. 11 is a diagram illustrating a configuration of areas to explain the above mentioned remapping. The area layout explained in the embodiment 1 is also used in this embodiment.

Defect Management Area (DMA) is an area in which the defect list is recorded and Temporary DMA (TDMA) is an area, in which a temporary defect list is recorded. The remapping table may be recorded in DMA and TDMA with the defect list and the temporary defect list. Herein, the defect list and the temporary defect list may be used to specify both the replacement information by defect management and the remapping information using the same data structure. It will help to simplify the implementation of the drive apparatus, because the interpretation of the entry is common for defect management and for pseudo-overwrite. When the entry specifies the remapping information, the entry in the table indicates the correspondence between the address of a block to be remapped and the address of a remapped block.

Spare areas are assigned out of a volume space, and the addresses in the spare area are indicated by SA's (Spare area Address).

The volume space comprises three tracks, in each of which the data is recorded sequentially. The start address of the unrecorded area in the track is managed as Next Writable Address (NWA). The status of a track is described by new terms: "Used" and "Reserved" in order to indicate the data in these tracks can be overwritten and the data may be remapped within the reserved track. The used track means that all sectors in a track have been used for data recording. The reserved track means that there is a sector(s), which has not been recorded. In other words, the data can be incrementally written into the reserved track. Since the volume structure has been previously recorded, Tracks #1 is a used track. Track #2 is a reserved track assigned for metadata recording. Track #3 is a reserved track assigned for user data recording.

An exemplary procedure for updating Data-A file and recording Data-B file onto the write-once optical disc is described.

At first, the Metadata file FE is read to obtain the area allocated for the Metadata file and the track information is obtained. Then the file system can recognize which track can be used for metadata writing, wherein MA (Metadata file Address) indicates a relative address within a Metadata file.

When the file system updates the Data-A file, the file entry is read in the memory and the file entry is updated in order to register the information to specify the location where the updated data will be written and the related information (e.g., size and updated time, etc) in the memory. The file system instructs the drive apparatus to overwrite the data of Data-A file logically. Then the drive apparatus stores the data (Data-A') physically to the NWA, as the corresponding physical sector is already recorded and the drive apparatus adds the entry to the defect list. If the file system instructs to write the data to NWA after querying the drive apparatus, it is not required to add the entry in the defect list. In this invention, this manner to save the entry is recommended, because the location of the data can be registered in the file entry. However, when a part of the large file has to be updated, the data to be updated may be overwritten instead of writing the whole data of the file. After the data is written on the disc, the file system instructs to overwrite the file entry (Data-A' FE) logically in order to specify the location of the written data and the updated time. Then the drive apparatus writes the data physically into the sector shown at MA #k+1 and stores the entry into the defect list.

When the file system newly records the Data-B file under the root directory, the directory is read into the memory and the directory is updated to add the new file (Data-B file) to this directory in the memory. Beforehand the file entry of the Data-B file is created in the memory, the data of Data-B file is written at the NWA in Track #3, and then the file entry (Data-B FE) and the root directory on the memory are written from the NWA shown as MA #k+2 in Track #2. To specify the new location of the root directory, the updated file entry for the directory is instructed to overwrite and the data is written at the NWA shown as MA #k+4. Thus, only the file entry of the directory among metadata is overwritten to save the entry, and the other metadata (the file entry of the file and the directory) and the data of the file are written without overwriting.

To indicate the integrity of the file structure, the updated Logical Volume Integrity Descriptor is instructed to overwrite (not shown in this figure).

In the above pseudo-overwrite operation, the data to be overwritten may be stored within the spare area or the NWA in the reserved track in response to an instruction to write the data into an already recorded area. The destination to store the data may be decided by the drive apparatus. Similarly, the data may be replaced within the spare area or the NWA in the track by defect management, when the data can not be recorded in the sector due to defect.

In case of rewritable discs, the file system reuses the available area. However, in the present invention the available area is not reused when the available area is used once. For example, in FIG. 11, although the logical sector at MA #i+1 in which the root directory was written became the available sector, the file system will not allocate any data at MA #i+1. If the data were written again into MA #i+1, the data would be remapped. In case of the data being written on an ECC block basis, one ECC block is written, even if only one sector of the ECC block is instructed to be written and the invalid data is recorded in the other sectors of the ECC block. The file system also will not reuse the area where the invalid data is recorded for the same reason.

Figure 12:
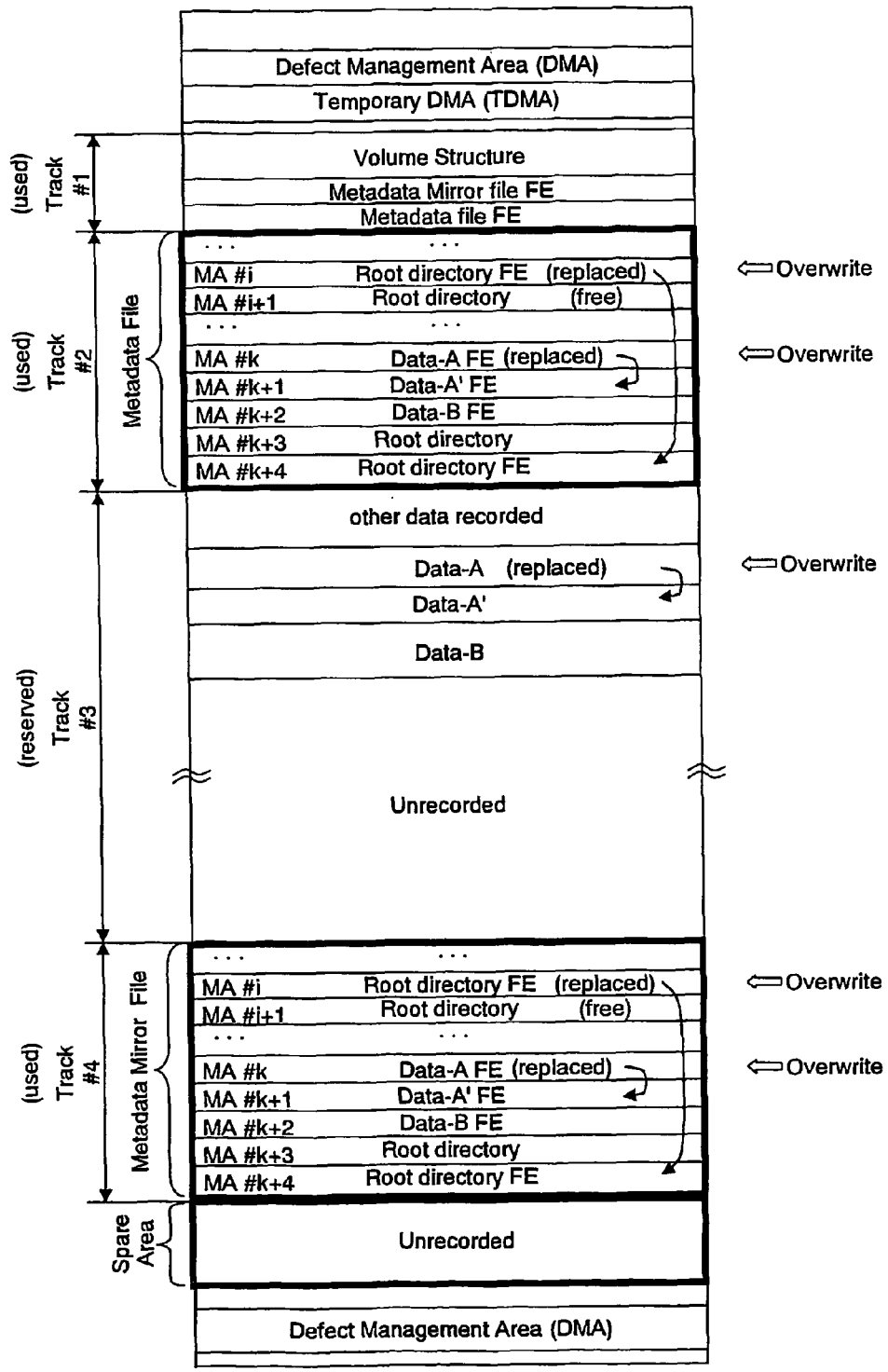
FIG. 12 is a diagram illustrating a configuration of areas having the track to write the metadata in the Metadata Mirror file.

FIG. 12 is a diagram illustrating a configuration of areas to explain the above-mentioned remapping. Similarly with FIG. 11, Data-A file is updated and Data-B file is newly recorded. In comparison with FIG. 11, the track which is intended to be used for the Metadata Mirror file is additionally reserved as Track #4, and the Metadata Mirror file FE specifies the location of the Metadata Mirror file. According to UDF 2.5, any metadata shall be recorded at the same relative address within the Metadata file and Metadata Mirror file, respectively, if the Metadata Mirror file exists. Although the Metadata Mirror file FE is not shown in FIGS. 11, 13 and 14 for purposes of simplification, when the Metadata Mirror file does not exist, the Metadata Mirror file FE indicates the location of the Metadata file.

An exemplary procedure for updating Data-A file and recording Data-B file onto the write-once optical disc is the same as the explanation for FIG. 11. In this example, the same metadata is written into the Metadata Mirror file, after the metadata is written into the Metadata file. The file system instructs the drive apparatus to read the Metadata file FE and Metadata Mirror file FE to know the area allocated for the Metadata file and Metadata Mirror file. Then the file system recognizes which track can be used for metadata writing, wherein MA (Metadata file Address) indicates a relative address within a Metadata file and Metadata Mirror file.

In the case that the file system updates the Data-A file, after the file system instructs to overwrite the file entry (Data-A' FE) logically in the Track #2 for Metadata file, the file system instructs the drive apparatus to overwrite the same file entry into the same relative address MA #k in the Metadata Mirror file. The drive apparatus writes the data physically into the sector shown at MA #k+1 and stores the entry into the defect list.

In the case that the file system newly records the Data-B file in the root directory, after the file system instructs to write the file entry (Data-B FE) and the root directory from the NWA shown as MA #k+2 in the Metadata file of Track #2, the file system instructs the drive apparatus to write the same file entry and the same root directory from the NWA shown as MA #k+2 in the Metadata Mirror file of Track #4. Then, after the file system instructs to overwrite the updated file entry for the directory at the NWA shown as MA #k+4 in the Metadata file of Track #2, the file system instructs to overwrite the same updated file entry at the NWA shown as MA #k+4 in the Metadata Mirror file of Track #4.

Thus, the robustness when the metadata is read is improved, as the same metadata is written at the same relative address in the Metadata file and Metadata Mirror file.

Figure 13:
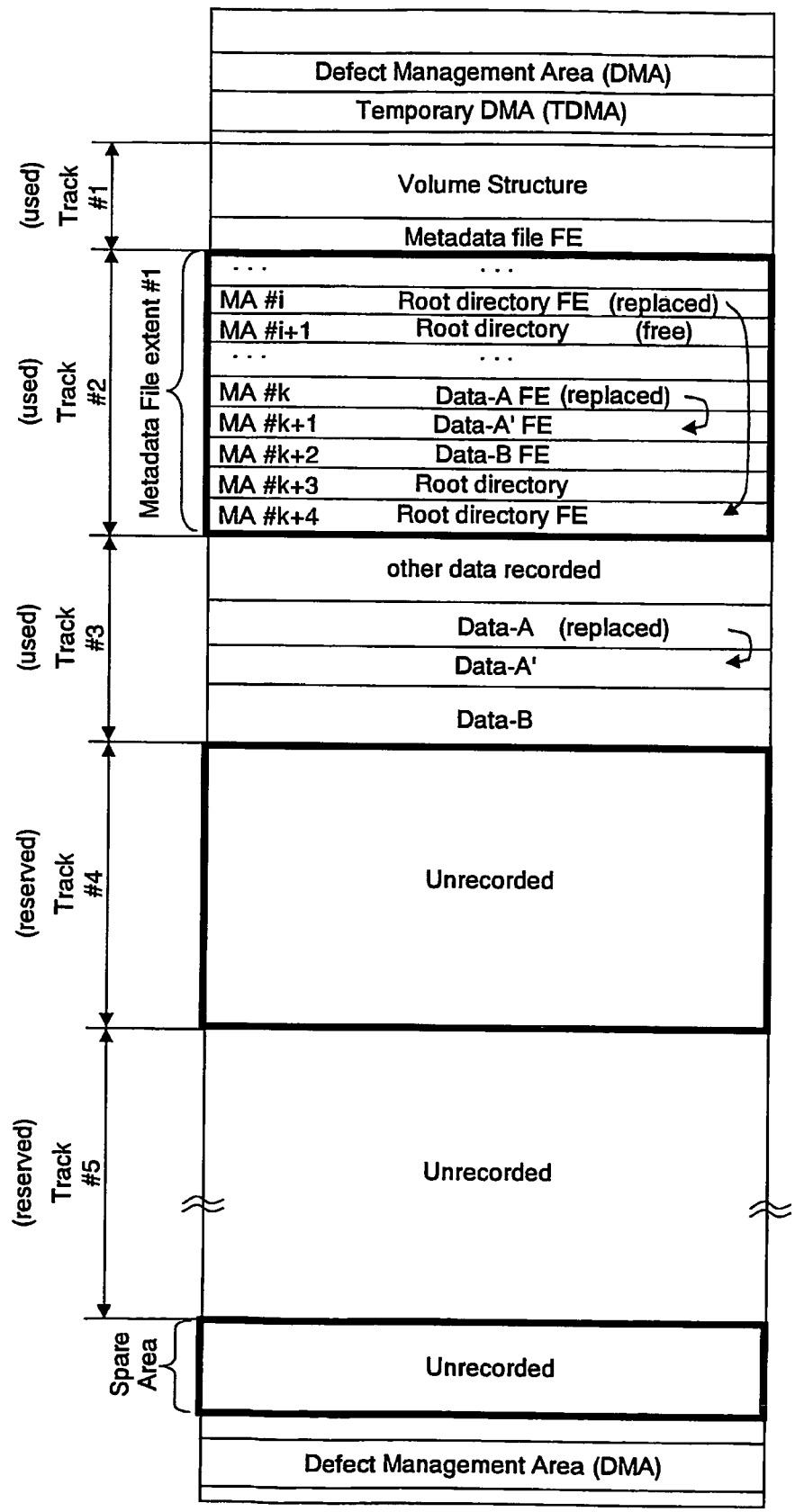
FIG. 13 is a diagram illustrating a configuration of areas after the new track for metadata writing is assigned.

FIG. 13 is a diagram illustrating a configuration of areas to explain the above-mentioned remapping. In FIG. 13, the new reserved track is assigned as Track #3 on the volume space explained in FIG. 11. This track is reserved in the unrecorded area in the track for user data writing, in order to write the additional metadata, because the Track #2 for metadata writing is used up. For example, Track #3 in FIG. 11 is terminated at the end of the recorded area; the new Track #4 is assigned from the unrecorded area after the termination of the Track #3.

Figure 14:
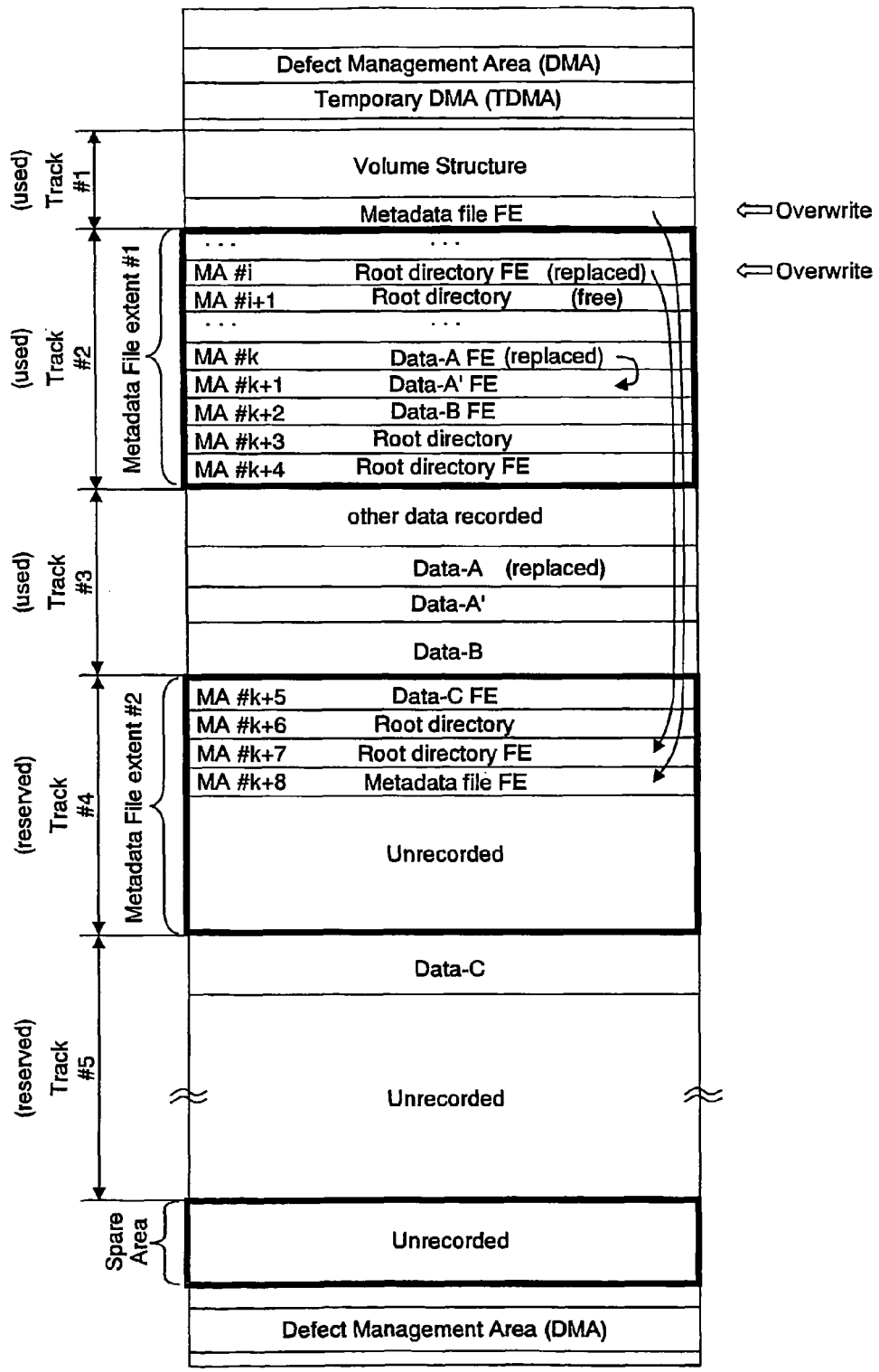
FIG. 14 is a diagram illustrating a configuration of areas after the metadata is written in to the new track for metadata writing.

FIG. 14 is a diagram illustrating a configuration of areas to explain the above-mentioned remapping. In FIG. 14, Data-C file is newly recorded in the root directory on the volume space explained in FIG. 13. The directory is read into the memory and the directory is updated to add the new file (Data-C file) to this directory in the memory. The file entry of the Data-C file is created in the memory, the data of Data-C file is written at the NWA in Track #5, then the file entry (Data-C FE) and the root directory on the memory are written from the NWA shown as MA #k+5 in Track #4. To specify the new location of the root directory, the updated file entry for the directory is instructed to overwrite at MA #i. As the Track #2 was used up, the data is written at the NWA in the other track. In this example, it is written at MA #k+7 in Track #4. The Metadata file FE is instructed to overwrite to specify the additional extent #2 of the Metadata file, and the data is written at the NWA shown as MA #k+8. The extent allocated for the Metadata file may not be the same as the newly assigned track, because the extent of the Metadata file can be extended by updating the Metadata file FE. Hence, the extent of Metadata file may be a part of the track.

Hereinafter a write procedure of the present invention is described. This write procedure is performed by the optical disc information recording/reproduction system described in FIG. 5.

FIGS. 15A-15D each comprises a diagram illustrating the blocks in a user data area, when the data is written using the pseudo-overwrite method. The user data area, PBA and LBA are the same definition as described in FIG. 7.

Figure 15A:
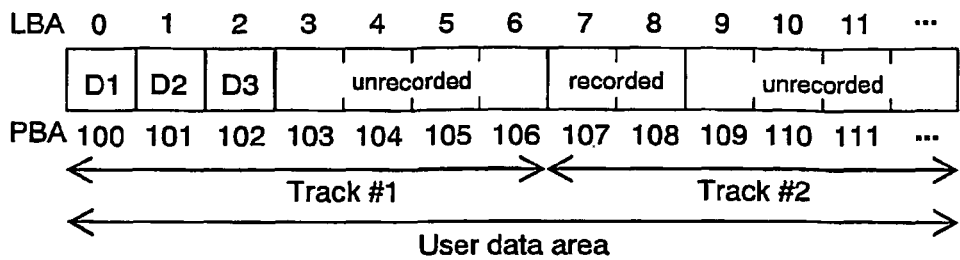
FIGS. 15A-15D each comprise a diagram illustrating the blocks in a user data area, when the data is written using pseudo-overwrite method.
Figure 15B:
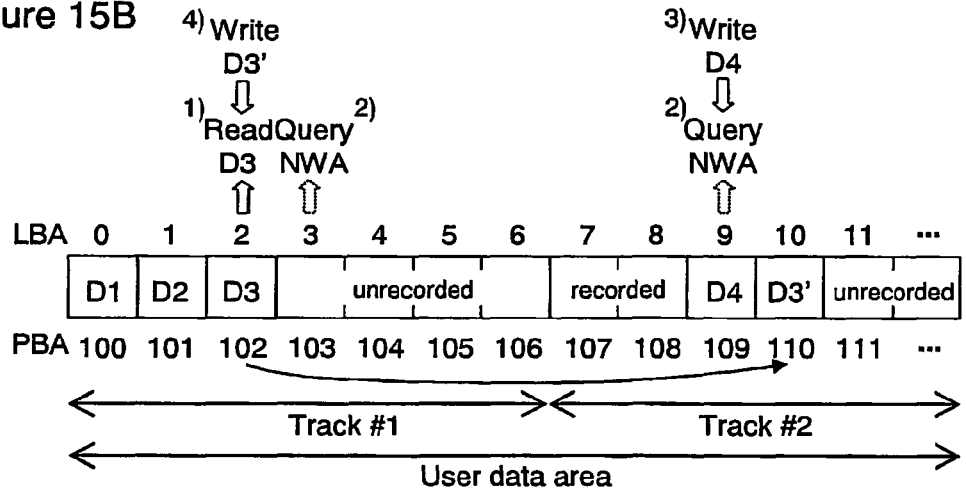

The procedure to update the file is described in FIGS. 15A and 15B. As shown in FIG. 15A, before the file is updated, the blocks PBA 100, 101, and 102 are recorded, and two tracks are reserved. The file entry (D3) of the file to be updated is stored in the block LBA 2. As shown in FIG. 15B, the file system;

1) instructs to read the file entry from LBA 2 in advance,
2) queries the NWA to the drive apparatus,
3) instructs to write the updated data (D4) of the file into the NWA (LBA 9) in the track for data writing so that the data is written without overwriting and creates the file entry (D3') so that the positional information in the read file entry is changed to specify the area where the updated data is written, and then
4) instructs to write the updated file entry (D3') into LBA2 in the track for metadata writing so that the file entry is overwritten. In this example, the data D3' is written physically at PBA 110, as the previous writing was at PBA 109. Thus, on overwriting, the drive apparatus may write the data into the other track.

Figure 15C:
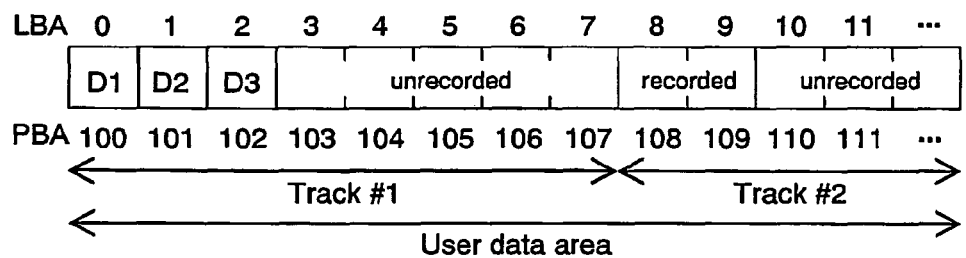
Figure 15D:
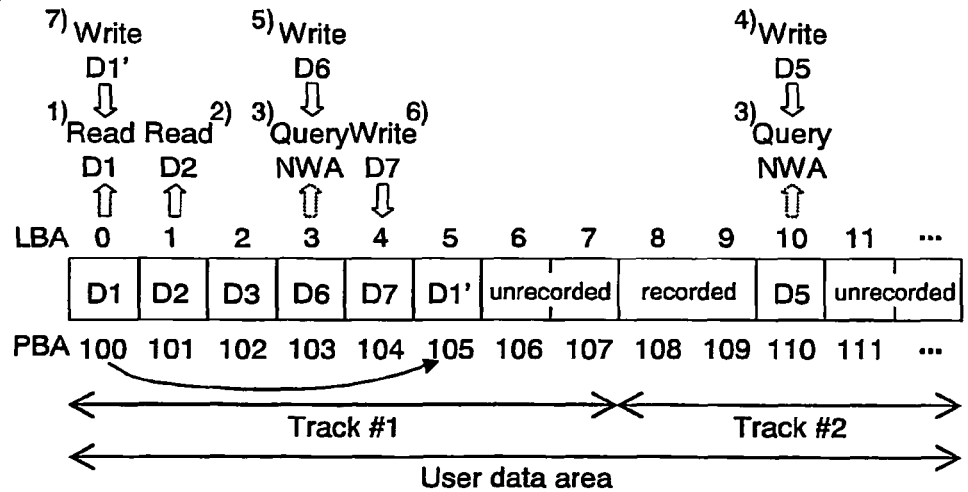

The procedure to record the file in the directory is described in FIGS. 15C and 15D. As shown in FIG. 15C, the blocks PBA 100, 101, 102, 108 and 109 are recorded, and two tracks are reserved. The file entry (D1) of the directory and the directory (D2) are stored in the blocks LBA 0 and 1. As shown in FIG. 15D, the file system;

1) instructs to read the file entry of the directory and the directory from LBA 0,
2) instructs to read the directory from LBA 1,
3) queries the NWA of each track to the drive apparatus in order to decide the location to write the data without overwriting,
 3-1) creates the file's file entry (D6) which has the positional information of the area allocated for the data of the file,
 3-2) creates the directory (D7) so that the new file is registered in the read directory (D2) and
 3-3) creates the file entry (D1') of the directory so that the positional information in the read file entry (D1) is changed to specify the area where the updated directory is allocated,
4) instructs to write the data (D5) of the file into NWA (LBA 10) in Track #2 for data writing,
5) instructs to write the file entry (D6) of the file from the NWA (LBA 3) in Track #1 for metadata writing,
6) instructs to write the directory (D7) to the next address so that the data is written continuously, and then
7) instructs to write the updated file entry (D1') into LBA0 so that the file entry is overwritten.

Thus, before any data is written, the file system queries the NWA. This is because the NWA may be changed, as the drive apparatus would write the data with remapping in its own. Next, the file system provides an instruction to write the data from NWA so that the data is written without being overwritten. Then, the file system instructs that the updated data be written with overwriting. This order to write the data is important to save the entry in the remapping table.

In the case of FIG. 15B, if the write procedure were not in this order, namely the data D3' is overwritten before the data D4 is written, the data D3' may be written into PBA 109 and the NWA is changed. This means the data D4 would be written with overwriting into LBA 9, but the data would be remapped into PBA 110. In the case of FIG. 15D, if the write procedure were not in this order, an additional entry would be added in the remapping table, as well.

In the case of rewritable discs, there are no such requirements. Typically, a different order is used for the rewritable disc cases to improve the reliability considering the recovery when a write procedure may terminate accidentally. On the other hand, in the case of write-once disc such recovery is not important; rather, it is important to save the entry in the remapping table, because the previous state remains by the write-once feature.

FIGS. 11A and 11B each comprise a flowchart illustrating a procedure to write the data on a write-once optical disc. This write procedure is performed by the optical disc information recording/reproduction system described in FIG. 5.

When the file is updated, the file system will instruct to write the data of the file so that the data is written without overwriting, and the file system will create the file entry by updating the written file entry and will instruct to write the file entry so that the file entry is overwritten.

When a new file is recorded under the directory, the file system creates the file entry of the file and creates the directory and the file entry of the directory by updating the written directory and it's file entry in the memory and instructs to write the data of the file, the file entry and the directory so that these data are written without overwriting. Then the file system will instruct to write the file entry of the directory so that the file entry is overwritten.

Figure 16:
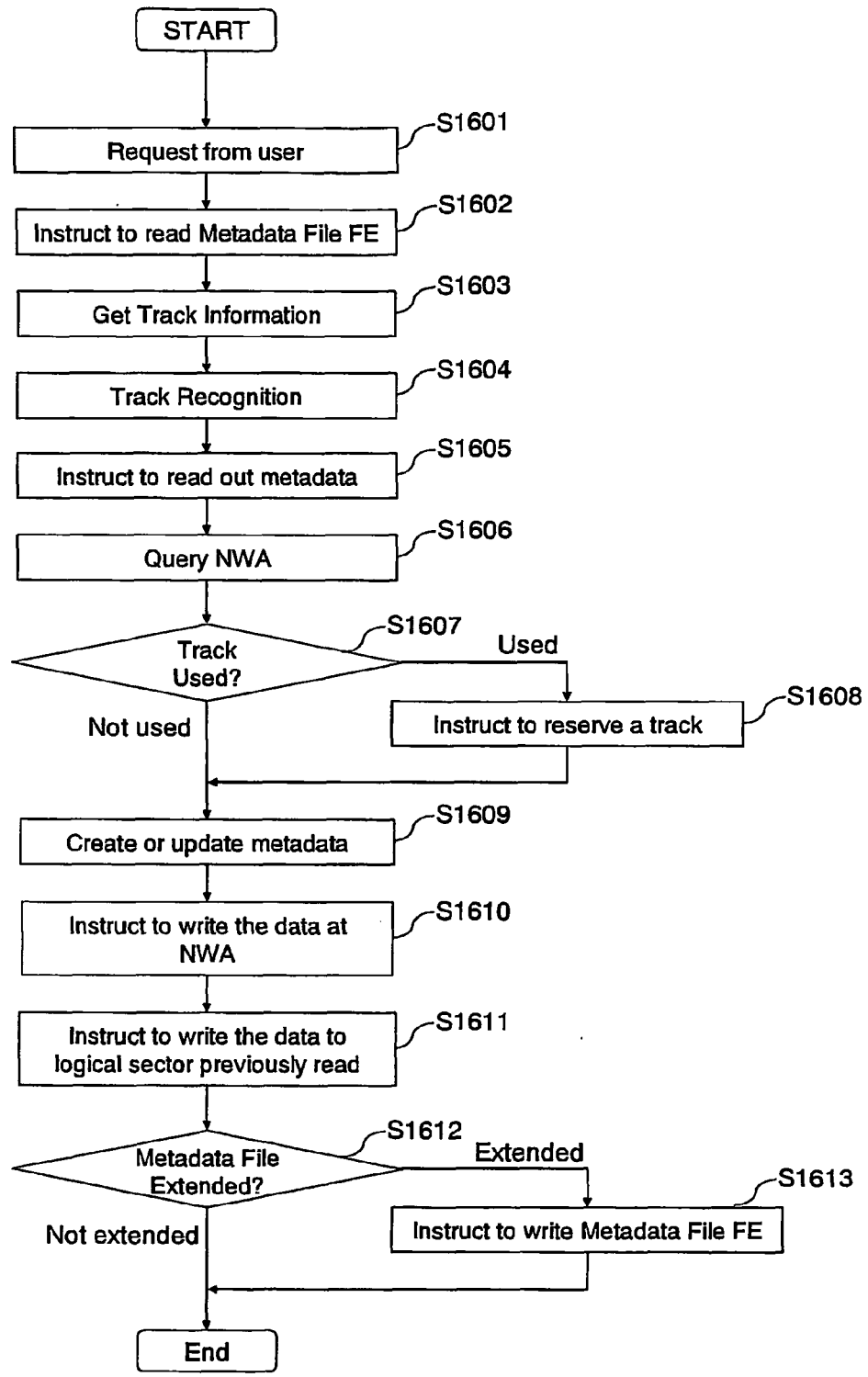
FIG. 16 is a flowchart illustrating a procedure to write the data by the file system performed in the controller of an optical disc information recording/reproduction system.

FIG. 16 shows the steps involved in the procedure to write the data on a write-once optical disc. A program is used to implement the procedure and is executed by controller 511 contained in the system controller 510. The system controller 510 instructs the drive apparatus 520 to write the data on the write-once optical disc. The controller 511 may include a semiconductor integrated circuit. The program is provided in various manners. For example the program may be provided in a form of a computer readable medium having the program recorded thereon. Alternatively, the program may be provided by downloading the program from a server via the internet. Once the program is installed into a computer, the computer functions as the system controller 510. The write-once optical disc includes a plurality of tracks.

Figure 17A:
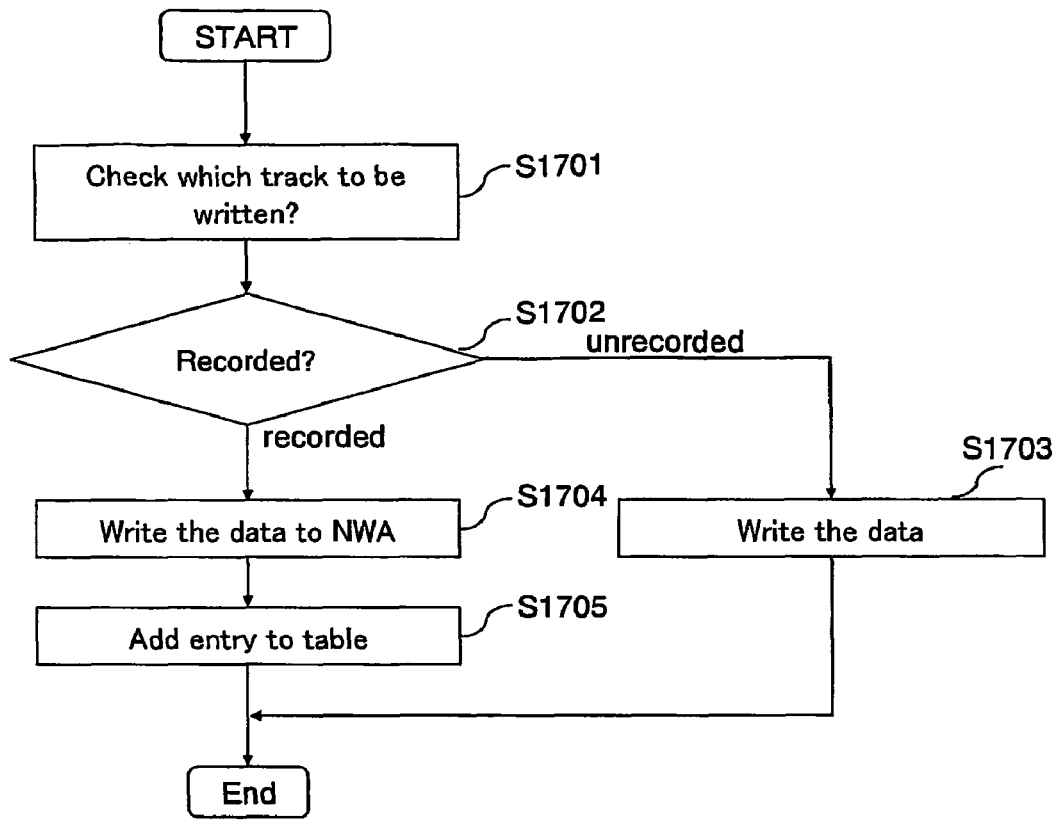
FIGS. 17A-17B each comprise a flowchart illustrating a procedure to write the data by the drive apparatus of an optical disc information recording/reproduction system.
Figure 17B:
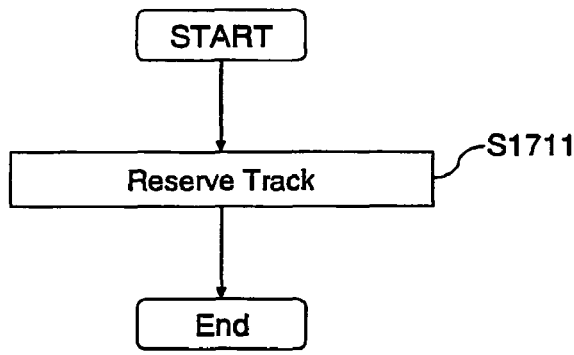

FIGS. 17A and 17B show the procedure performed by the drive apparatus 520.

In step S1601, the system controller 510 receives a write request which specifies at least data for a file to be written from the user. For example, the request is to replace Data-A file as new data or to copy Data-B file from the other media to under the root directory on this disc. The data to be written is transferred to the memory 512 in the system controller 510 and the destination to record the data is indicated by the pathname in the directory tree structure.

In step S1602, the controller 511 instructs the drive apparatus 520 to read the file entry of a metadata file, i.e. the Metadata file FE, which contains metadata for managing the file requested by a user from the write-once disc. From this the Metadata, the file FE is obtained.

In step S1603, the controller 511 instructs the drive apparatus 520 to obtain the track information indicating a location of each of the plurality of tracks.

In step S1604, the controller 511 checks each track to determine a track in which metadata is written next, based on the file entry of the Metadata file and the track information. If a part of the track is assigned for the extent of the Metadata file or the Metadata Mirror file, the track will be used to write metadata into the Metadata file or the Metadata Mirror file, respectively.

In step S1605, the controller 511 instructs the drive apparatus 520 to read the metadata from a location of the write-once optical disc, so as to obtain the metadata. The metadata, such as a file entry and directory, are read from the Metadata File.

In step S1606, the controller 511 queries the drive apparatus 520 for the next writable address NWA, which indicates a location at which data is to be written next within a track, before it instructs the drive apparatus 520 to write the data. This is because there is a possibility that the drive apparatus 520 will move the NWA. The drive apparatus 520 sends the queried NWA to the system controller 510, and the system controller 510 sends the NWA to the controller 511. The track is selected from the plurality of tracks. The controller 511 may query NWAs for a plurality of tracks, but queries at least a NWA for a track other than a track determined in step S1604.

In step S1607, the controller 511 determines whether or not a next writable address NWA within the track determined in step S1604 is valid. If the NWA within the track in not valid, the procedure goes to step S1608. For example, if the invalid address is returned as NWA in the step S1606, it can be recognized that there is no NWA in the track. In the step S1604 or S1606, the state of the track may be queried, via a query to the drive apparatus 520. If the track is a used status, there is no NWA in the track.

In step S1608, the controller 511 instructs the drive apparatus 520 to allocate a first track in which metadata is to be next written and a second track in which data is to be next written. As the file system instructs the drive apparatus 520 to allocate the new track, the controller 511 can update the NWA obtained in step S1606 to a NWA within the second track. In case of FIG. 13, the NWAs are at the start addresses in Tracks #4 and #5. The first track and the second track are allocated within the track selected in step S1606.

In step S1609, in response to the users write request, the controller 511 creates or updates at least a part of the metadata so that the data amount to be overwritten is minimized by distinguishing the type of the data to be written. As described in the explanation for FIG. 11, in the case a file is updated, the file system creates the file entry to specify the location of the data to be written. This file entry is the data to be overwritten. In the case a new file is recorded under the directory, the file system creates the file entry of the new file and updates the directory to register the new file and the file entry of the directory. The file entry of the directory is the data to be overwritten and the other metadata is the data that can be written without being overwritten. As examples of the updated metadata, the updated metadata may include a file entry of a directory under which a file is recorded, or a file entry of the file.

In step S1610, the controller 511 instructs the drive apparatus 520 to write the data that can be written without being overwritten at a location indicated by the NWA.

In step S1611, the controller 511 instructs the drive apparatus 520 to write at least a part of the updated metadata at the location from which the metadata was read so that the data is overwritten in the logical sector. In step S1610 and S1611, the same write command can be used to instruct to write the data, because the drive apparatus 520 can determine whether the data should be written with overwrite or without by checking the status of the logical sector in step S1702. In steps S1610 and S1611 data is written to different addresses which are indicated in different manners, for example, step S1610 writes the data specified by a user write request (step S1601), while step S1611 writes the metadata which has been read (step S1602). To avoid possible errors step S1611 is performed after step S1610.

In step S1612, the controller 511 determines whether or not the first track is allocated and at least the part of the updated metadata is written in the first track. If it is determined that first track is allocated and at least the part of the updated metadata is written in the first track, the process proceeds to step S1613.

In step S1613, the controller 511 updates the file entry of the Metadata file to reflect the writing of at least the part of the updated metadata, and instructs the drive apparatus 520 to write the updated file entry of the Metadata file at the location from which the file entry of the metadata file is read in step S1602.

In response to the instruction from the controller 511 to write the data, the procedure followed by the drive apparatus 520 is shown in FIG. 17A.

In step S1701, the drive apparatus 520 receives the write instruction which specifies at least a logical sector in which the data is to be written, from the controller 511 and checks which track is to be written. The drive apparatus 520 also obtains track information indicating a location of each of the plurality of tracks, and determines a track from each of the tracks in which data is to written next, based on the logical sector specified by the write instruction and the track information.

In step S1702, the drive apparatus 520 determines whether logical sector specified by the write instruction corresponds to a recorded to a recorded physical sector or an unrecorded physical sector. In this check, the drive apparatus 520 judges the state of the physical sector using the logical sector number which is instructed to write by the controller 511. When the logical sector number is smaller than the NWA, the physical sector is recorded, or else unrecorded. If the logical sector specified by the write instruction corresponds to an unrecorded physical sector the process proceeds to step S1703, otherwise if the logical sector corresponds to a recorded physical sector the process proceeds to step S1704.

In step S1703, the drive apparatus 520 writes the data into the unrecorded physical sector which corresponds to the logical sector in advance.

In step S1704, the drive apparatus 520 writes the data into a physical sector indicated by a next writable address within the track determined in step S1701. When the data is remapped on an ECC block basis, the other unrecorded physical sector is one of the sectors belonging to the ECC block which is the next writable block. For example, in case the ECC block consists of 32 sectors, the second sector in the ECC block is instructed to be overwritten, the data is physically written into the second sector in the next writable ECC block. Thus the relative address within the ECC block is kept for the remapped ECC block.

In step S1705, the drive apparatus 520 generates a remapping table including remapping information which remaps an original address of the recorded physical sector to a remapping address of the physical sector indicated by the next writable address, and stores the remapping information to the defect list/remapping table. In case the ECC block consists of 32 sectors, the original address is the start address of the ECC block to which the original physical sector belongs and the remapped address is the start address of the ECC block to which the remapped physical sector belongs.

In response to the instruction from the controller 511 to reserve a track, the procedure followed by the drive apparatus 520 is shown in FIG. 17B.

In step S1711, the drive apparatus 520 receives an allocation instruction from the controller 511 and allocates at least one track in response to the allocation instruction. The allocation of at least one track includes allocating a first track and a second track within the track determined in step S1701.

Figure 18:
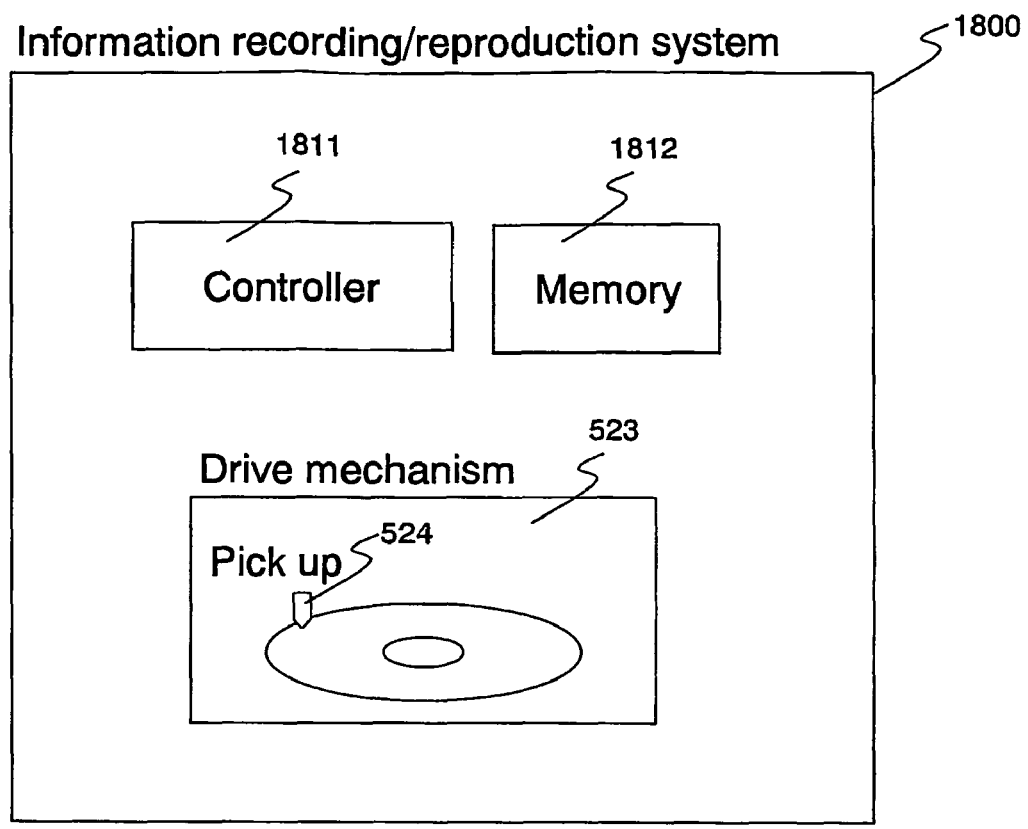
FIG. 18 is a diagram illustrating an optical disc information recording/reproduction system which is a part of consumer video recorder or consumer video player.

When this invention is applied to the recording/reproduction system such as a consumer video recorder or a consumer video player, the controller 511 and the drive apparatus 520 may be controlled by the common micro processor as shown in FIG. 18. In this case, the controller 511 may not query the NWA to the drive apparatus 520, because the recording/reproduction system knows the NWA. At first, the NWA in each track is checked when the disc is loaded in the drive unit, then this system can manage the NWA after some data is written.

FIG. 18 shows an optical disc information recording/reproduction system 1800 which is a part of a consumer video recorder or a consumer video player. The information recording/reproduction system 1800 includes a controller 1811, a memory 1812 and a drive mechanism 523 for reading and writing information from and onto an optical disc. The controller 1811 may be, for example, a semiconductor integrated circuit such as a CPU (Central Processing Unit) and performs the method described in the embodiments of the present inventions. Further, a program for causing the controller 1811 to perform the method described in the embodiments is stored in the memory 1812. In the controller 1811, a file system, a utility program, or a device driver may be performed. The drive mechanism 523 may be controlled by the controller 1811.

Figure 19:
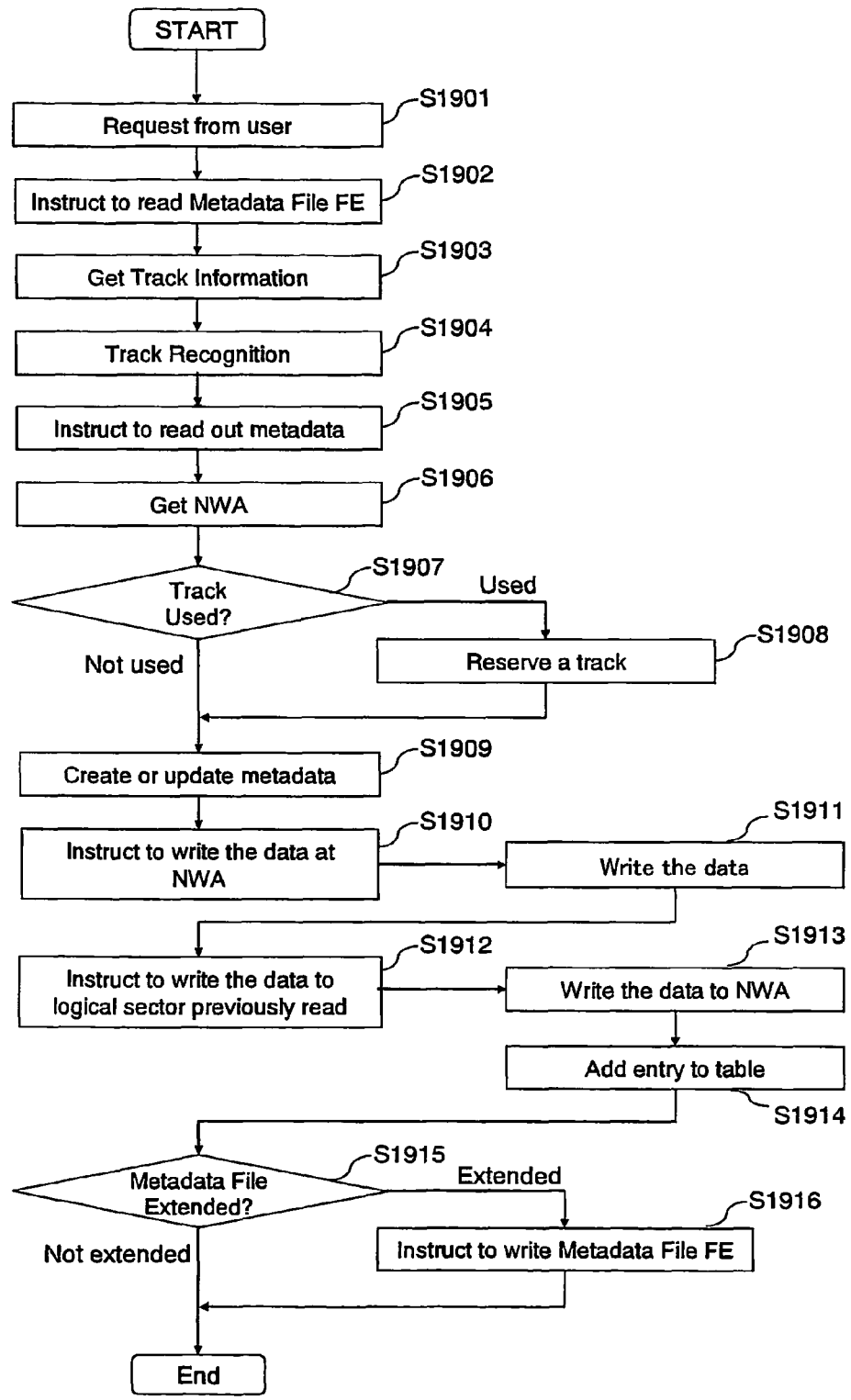
FIG. 19 is a flowchart illustrating a procedure to write the data on a write-once optical disc by the recording/reproduction system explained in FIG. 18.

FIG. 19 is a flowchart illustrating a procedure to write the data on a write-once optical disc by the recording/reproduction system explained in FIG. 18.

In step S1901, the controller 1811 receives the request from the user. For example, the request is to replace Data-A file as new data or to copy Data-B file form the other media to the root directory on this disc. The data to be written is transferred to the memory 1812 and the destination to record the data is indicated by the pathname in the directory tree structure.

In step S1902, the file system instructs the drive apparatus to read the data which is the Metadata file FE to recognize the areas allocated for the Metadata file and the Metadata Mirror file.

In step S1903, the file system instructs the drive apparatus to get the track information.

In step S1904, the file system checks each track whether the track is used for metadata writing. If a part of the track is assigned for the extent of the Metadata file or the Metadata Mirror file, the track will be used to write metadata into the Metadata file or Metadata Mirror file, respectively.

In step S1905, the file system reads the data to retrieve the directory or file which is requested by the user. The metadata such as a file entry and directory are read from the Metadata File.

In step S1906, the file system gets the NWA before writing the data.

In step S1907, the file system checks whether each track is used or not. If the track for metadata writing is used up, it then goes to step S1908.

In step S1908, the drive apparatus assigns the new track as a reserved track in the track used for data writing:

In step S1909, in response to the user requests, the file system creates some of the metadata so that the data amount to be overwritten is minimized by distinguishing the type of the data to be written. As described in the explanation for FIG. 11, in the case a file is updated, the file system creates the file entry to specify the location of the data to be written. This file entry is the data to be overwritten. In the case a new file is recorded under the directory, the file system creates the file entry of the new file and updates the directory to register the new file and the file entry of the directory. The file entry of the directory is the data to be overwritten and the other data is the data which can be written without being overwritten. The data type is distinguished as type I: no need to be overwritten and type II: needs to be overwritten.

In step S1910, the file system instructs to write the type I data into the logical sector from the NWA. Then, it goes to step S1911 which is the operation to write the data without overwriting.

In step S1912, the file system instructs to overwrite the type II data into the logical sector. Then it goes to step S1913 to perform the operation to overwrite the data in the logical sector. The write command instructed to write the data may be different for type I and II.

In step S1911, the data is written to the physical sector that corresponds to the logical sector in advance.

In step S1913, the data is logically overwritten on the logical sector and physically written into the other unrecorded physical sector, especially to the NWA.

In step S1914, the entry as the remapping information is created to specify the original address of the physical sector corresponding to the logical sector in advance and the remapping address of the physical sector in which the data is written, and is stored to the defect list.

In step S1915, the file system checks whether the area allocated as the extent of the Metadata file and the Metadata Mirror file are extended. If the area is extended, it then goes to step S1916.

In step S1916, the file system changes the file entry of the Metadata file and Metadata Mirror file so that the file entry specifies the extended area and instructs the drive apparatus to write the file entry in the logical sector where it is read in step S1902.

Figure 20:
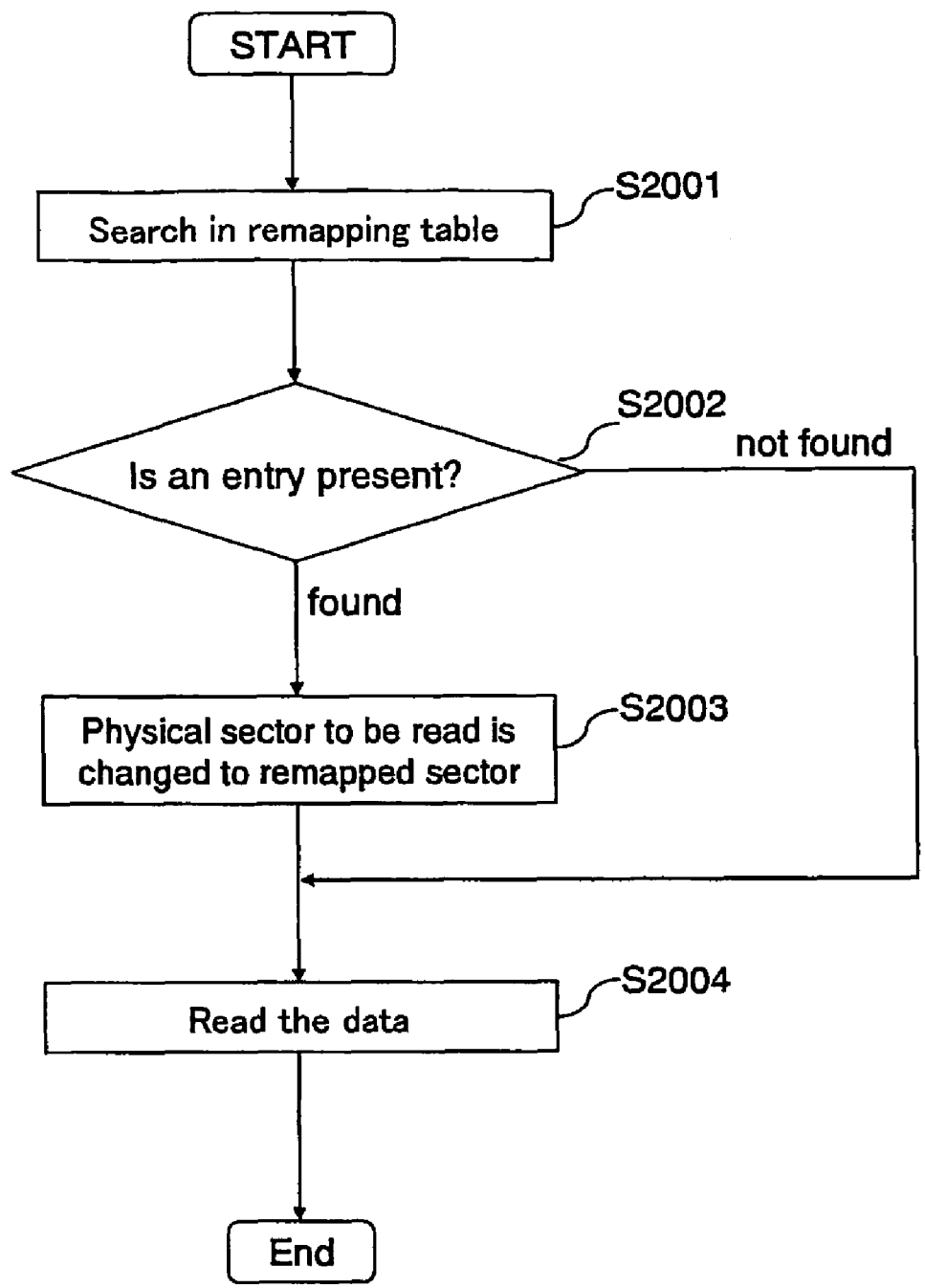
FIG. 20 is a flowchart illustrating a procedure to read the data from a write-once optical disc by the recording/reproduction system explained in FIGS. 5 and 18.

The reproduction procedure from the write-once disc on which disc the data is written using the above explained methods in FIGS. 16, 17A, 17B and 19 is explained hereinafter. FIG. 20 is a flowchart illustrating a procedure to read the data from a write-once optical disc by the recording/reproduction system explained in FIGS. 5 and 18. In FIG. 20, the recording/reproduction system receives a read instruction which specifies at least a logical sector from which data is to be read.

In step S2001, the original address of all entries stored in the remapping table are searched. As the logical sector number to be read is instructed, the physical sector number which corresponds to the logical sector in advance is used to search the entry which indicates the physical sector is remapped. When the remapping is performed on an ECC block basis, the start address of the ECC block is registered in the entry. In this case, it is checked whether the physical sector number belongs to the remapped ECC block or not. This operation may be done by a drive apparatus in the case of an Information recording/reproduction system as described in FIG. 5.

In step S2002, if the entry is found, it then goes to step S2003, else step S2004.

In step S2003, the original address of the physical sector is replaced with the remapping address of the physical sector, which is indicated in the found entry. If the entry is not found in step S2002, then the address to be read is determined as the address of the physical sector corresponding to the logical sector specified by the read instruction. If the entry is found in S2002, then the address to be read is determined as the remapping address corresponding to the original address found in the remapping table.

In step S2004, the data is read at the determined address.

As explained above, when the address is not found, the data is read from the physical sector corresponding to the logical sector in advance, because the remapping table shows the data stored in the logical sector is not remapped to the other physical sector.

When the address is found, the data is read from the physical sector specified by the remapping address in the found remapping information, because the entry found in the remapping table shows the data stored in the logical sector is remapped.

If the data is remapped within the volume space, especially to the NWA in the track rather than into the spare area, the data can be read out more quickly.

As described in the above embodiments, this invention can be applied to the drive apparatus on the assumption that the file system minimizes the data amount to be overwritten and the file system instructs to write the data to an unrecorded sector by querying the drive apparatus, when the data is written without being overwritten.

Embodiment 4

In this embodiment, as an example, guidelines and requirements are described for the UDF file system implementation.

(Benefit to Using A Pseudo-Overwrite Method)

In order to reduce complexity due to physical characteristics, new sequential recording media with overwritable features are introduced as pseudo-overwritable media. The pseudo-overwrite method is applied to this pseudo-overwritable media. The following sets forth some of the benefits of introducing the new sequential recording media:

1) An overwritable volume space and a defect free space are provided, similar to a rewritable media. In other words, compatibility with write-once media is ensured by a drive unit which supports overwritable mechanism and defect management.

2) Session close and Border close are not necessary, as a read-only drive unit supporting Pseudo-overwrite media has access to an unrecorded area.

3) Metadata Partition and its mirror can be used.

(Characteristics of Pseudo-Overwritable Media)

The physical characteristics of pseudo-overwritable media are described form the viewpoint what is required by the file system driver.

Pseudo-overwritable media supports multi-track recording and an overwritable function for thelogical sectors in a volume space. More than one track can be used to record. A new track can be assigned as a reserved track. A sequential recording mode is to be used within a track, to simplify the space management. The pointer to the recordable area is Next Writable Address (NWA), which is obtained through an inquiry of a drive apparatus.

When the data is intended to be recorded on the recorded logical sector, the data is recorded either within the Spare Area by linear replacement algorithm or to NWA within the volume space. As a benefit of remapping the data to NWA within the volume space, all available media capacity can be used, even if all of the Spare Area is recorded. Read modify write operation is also supported, therefore, each logical sector can be overwritten separately.

The address information where the data is replaced or remapped from the original address is stored as a defect list entry out of volume space and managed by a drive apparatus.

(Write Strategy by the file system)

In general, a track can be assigned by considering the data type to be recorded for example, metadata or specific data such as audio/visual data, still picture data, music data and so forth. On multi-track recording, when a reserved track is used up, a new track is assigned, adaptable to the amount of recorded data. The track for metadata recording is explicitly indicated as an extent of the Metadata File or the Metadata Mirror File.

If pseudo-overwrite media has the restriction that a new track can not be assigned after a track is assigned at the end of the volume space, multi-track recording is used in an intermediate state in which only one AVDP is recorded at LSN 256. To according to ECMA 167 requirements to, the AVDP shall be recorded in at least two of three locations (i.e. LSN 256, LSN −256 and Last LSN). In this example the track is assigned to record AVDP at Last LSN −256 or Last LSN.

A Metadata Mirror File can be also used. It is recommend to create a Metadata Mirror File when the disc is stored for archiving. In case of online usage, the implementation is to record such that the contents recorded in the Metadata File and the Metadata Mirror File have the same offset in each file, although the offset of NWA in each track sometimes may not be the same due to the recording condition of each track.

Figure 21A:
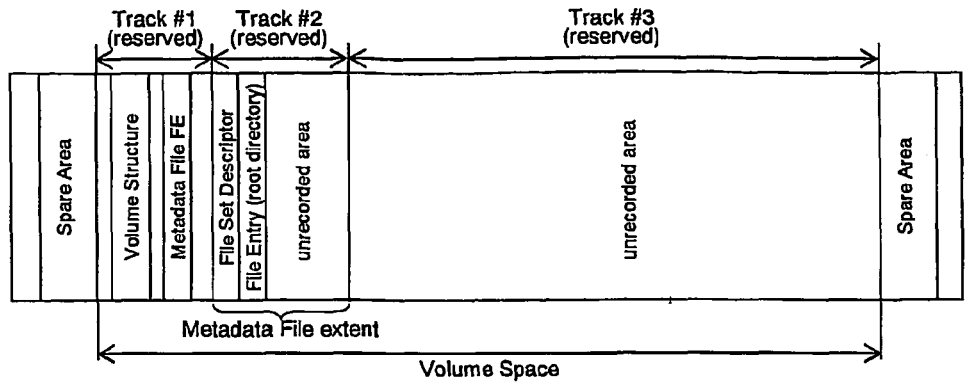
FIGS. 21A-21C each comprise an example of track layouts after logical format, and after some files are recorded.

FIG. 21A shows an example of a track layout after a logical format. At first volume structure including AVDP at LSN 256 and the related file structure is recorded. Then, a track is assigned for metadata recording, and the metadata is recorded in the track. The remaining area in the volume space is used for file data recording.

Figure 21B:
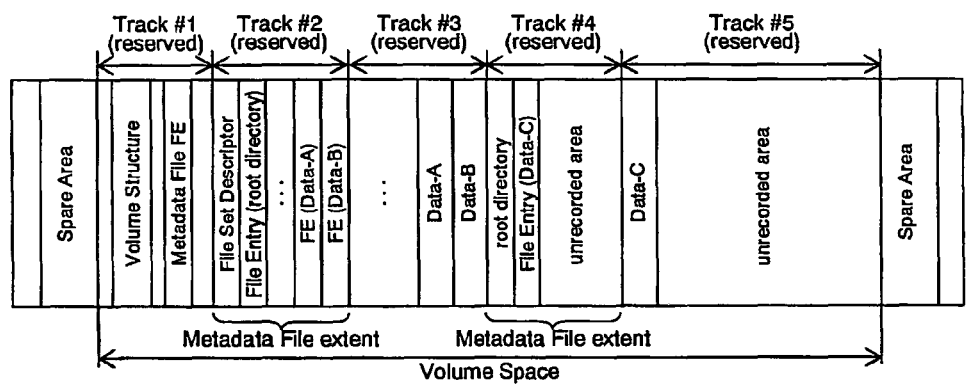

FIG. 21B shows an example of a track layout after some files are recorded. After the first track is used up, a new track is assigned. Thus, additional tracks may be assigned one after another.

Figure 21C:
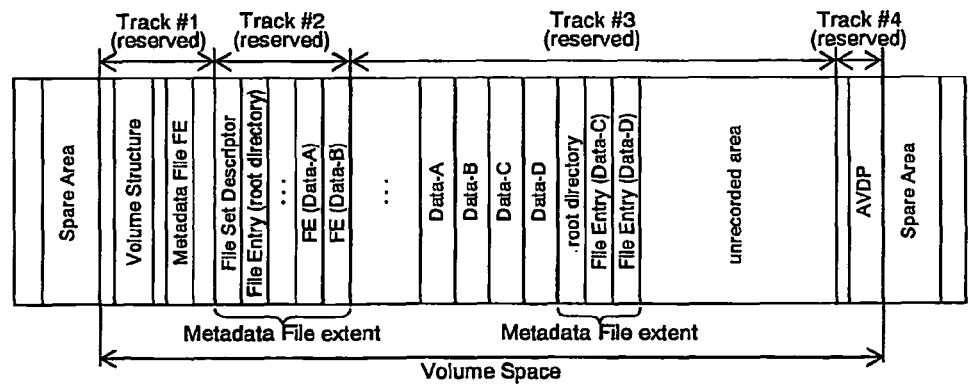

FIG. 21C shows another example of a track layout after some files are recorded. When the track for metadata recording is used up, an additional area for Metadata File may be allocated in the data track as an extent, not a track.

(Requirements for File System)

Requirements for pseudo-overwrite method are listed as follows:

1) Implementations are to recognize Pseudo-overwritable media by inquiring to the drive unit.

2) An Unallocated Space Bitmap and an Unallocated Space Table shall not be recorded.

3) A Metadata Bitmap File shall not be recorded.

4) Implementation should always query for NWA in each track prior to writing additional data recording. If a write command is issued to an already-recorded area, the defect list entry is used. Therefore, this requirement is important to reduce an unnecessary defect list entry as the size of defect list is limited.

5) Deleted blocks should not be reused to query NWA for the same reason.

6) The metadata to be overwritten should be minimized. It is recommended that only the directory File Entry should be overwritten.

INDUSTRIAL APPLICABILITY

The present invention is useful to provide a recording method for a write-once disc using a logical overwritable mechanism, and a semiconductor integrated circuit for use in the recording apparatus or the reproduction apparatus.

The invention claimed is:

1. A recording method for instructing a drive apparatus having a pseudo-overwrite function to write data on a write-once disc, the write-once disc including a volume space comprising a plurality of tracks, said pseudo-overwriting function allowing the drive apparatus to write data into an unrecorded area in response to an instruction to write said data into an already recorded area by replacement operation, the recording method comprising the steps of:

(a) receiving a write request which specifies at least data for a file to be written;
(b) instructing the drive apparatus to read a file entry of a metadata file which contains metadata for managing the file from a location of the write-once disc, so as to obtain the file entry of the metadata file;
(c) obtaining track information indicating a location of each of the plurality of tracks;
(d) determining a track from the plurality of tracks in which metadata is to be written next, based on the file entry of the metadata file and the track information;
(e) instructing the drive apparatus to read the metadata from a location of the write-once disc, so as to obtain the metadata;
(f) obtaining a next writable address indicating a location at which data is to be written next within a track other than the track determined in the step (d), the track being selected from the plurality of tracks (S1606);
(g) updating the metadata to reflect the writing of the data specified by the write request;
(h) instructing the drive apparatus to write the data specified by the write request to a location indicated by the next writable address in the write-once disc; and
(i) instructing the drive apparatus to write at least a part of the updated metadata to the location from which the metadata is read in the step (e) in the write-once disc,
characterized by further comprising the steps of:
determining whether or not a next writable address within the track determined in the step (d) is valid;
when it is determined that the next writable address within the track determined in the step (d) is not valid, instructing the drive apparatus to allocate a first track in which metadata is to be written next and a second track in which data is to be written next, and updating the next writable address obtained in the step (f) to a next writable address within the second track;
determining whether or not the first track is allocated and at least the part of the updated metadata is written in the first track; and
when it is determined that the first track is allocated and at least the part of the updated metadata is written in the first track, updating the file entry of the metadata file to reflect the writing of at least the part of the updated metadata and instructing the drive apparatus to write the updated file entry of the metadata file at the location from which the file entry of the metadata file is read in step (b).

2. A system controller for instructing a drive apparatus having a pseudo-overwrite function to write data on a write-once disc, the write-once disc including a volume space comprising a plurality of tracks, said pseudo-overwriting function allowing the drive apparatus to write data into an unrecorded area in response to an instruction to write said data into an already recorded area by replacement operation,
the system controller comprising a controller for controlling the drive apparatus,
characterized in that the controller is configured to perform a process including the steps of the recording method according to claim 1.

3. A system controller according to claim 2, wherein the controller includes a semiconductor integrated circuit.

4. A non-transitory computer readable storage medium having stored thereon a program for use in a system controller for instructing a drive apparatus having a pseudo-overwrite function to write data on a write-once disc, the write-once disc including a volume space comprising a plurality of tracks, said pseudo-overwriting function allowing the drive apparatus to write data into an unrecorded area in response to an instruction to write said data into an already recorded area by replacement operation,
the program being characterized in that it is configured to perform a process including the steps of the recording method according to claim 1.

* * * * *